(12) United States Patent
Lu et al.

(10) Patent No.: US 12,526,019 B2
(45) Date of Patent: Jan. 13, 2026

(54) METHODS, BASE BAND UNIT SYSTEM AND RADIO UNIT OF A DISTRIBUTED BASE STATION SYSTEM ADAPTED FOR BEAMFORMING

(71) Applicant: Telefonaktiebolaget LM Ericsson (publ), Stockholm (SE)

(72) Inventors: Chenguang Lu, Sollentuna (SE); Yezi Huang, Täby (SE); Miguel Berg, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 326 days.

(21) Appl. No.: 18/280,937

(22) PCT Filed: Mar. 8, 2021

(86) PCT No.: PCT/SE2021/050203
§ 371 (c)(1),
(2) Date: Sep. 7, 2023

(87) PCT Pub. No.: WO2022/191744
PCT Pub. Date: Sep. 15, 2022

(65) Prior Publication Data
US 2024/0154660 A1 May 9, 2024

(51) Int. Cl.
*H04B 7/06* (2006.01)
*H04B 7/0452* (2017.01)

(52) U.S. Cl.
CPC ......... *H04B 7/0617* (2013.01); *H04B 7/0452* (2013.01)

(58) Field of Classification Search
CPC .... H04B 7/0617; H04B 7/0452; H04B 7/024; H04W 88/085
See application file for complete search history.

(56) References Cited

U.S. PATENT DOCUMENTS 8,838,051 B1 9/2014 Su et al.
2015/0124688 A1 5/2015 Xu et al.
(Continued)

FOREIGN PATENT DOCUMENTS

JP 2011524117 A 8/2011
JP 2020504494 A 2/2020
(Continued)

OTHER PUBLICATIONS

Zhou, Y. et al., "Flexible Functional Split Design for Downlink C-RAN With Capacity-Constrained Fronthaul", IEEE Transactions on Vehicular Technology, vol. 68 No. 6, Jun. 2019, pp. 6050-6063, IEEE.
(Continued)

*Primary Examiner* — Kevin C. Harper
*Assistant Examiner* — Guoxing Fan
(74) *Attorney, Agent, or Firm* — COATS & BENNETT, PLLC

(57) ABSTRACT

Disclosed is a method performed by a Baseband unit, BBU, system comprising a distributed base station system that comprises a BBU, a first radio unit, RU, connected to the BBU over a fronthaul link, and a second RU connected to the first RU over an RU link. The method comprises determining a first and second portion of beamforming weights, BFW, based on a DL channel estimate of the first respective second RU, wherein the BFW are to be used for beamforming K user-layer DL signals to be sent to a number of UEs, and determining a first part of the BFW based on the DL channel estimates of the first RU and the second RU, for performing interference cancellation between the user-layer signals. Sending the first part of the BFW and the first and second portion of the BFW to the first RU and the first RU forwards the received BFWs to the second RU.

26 Claims, 7 Drawing Sheets

(56) References Cited

U.S. PATENT DOCUMENTS

| | | |
|---|---|---|
| 2015/0358057 A1 | 12/2015 | Lindqvist et al. |
| 2016/0211893 A1 | 7/2016 | Kim et al. |
| 2018/0138957 A1 | 5/2018 | Wang et al. |
| 2019/0373627 A1 | 12/2019 | Luo et al. |
| 2020/0052752 A1 | 2/2020 | Nammi et al. |
| 2021/0111930 A1 | 4/2021 | Davydov et al. |
| 2021/0119674 A1 | 4/2021 | Yuan |
| 2021/0243840 A1* | 8/2021 | Raghothaman ....... H04L 5/0044 |
| 2022/0201796 A1 | 6/2022 | Nakata et al. |

FOREIGN PATENT DOCUMENTS

| | | |
|---|---|---|
| WO | 2009143176 A2 | 11/2009 |
| WO | 2016115546 A1 | 7/2016 |
| WO | 2018091089 A1 | 5/2018 |
| WO | 2018103897 A1 | 6/2018 |
| WO | 2018164614 A1 | 9/2018 |
| WO | 2019098897 A1 | 5/2019 |
| WO | 2019132743 A1 | 7/2019 |
| WO | 2020217989 A1 | 10/2020 |
| WO | 2020256609 A1 | 12/2020 |

OTHER PUBLICATIONS

3rd Generation Partnership Project, "3rd Generation Partnership Project; Technical Specification Group Radio Access Network; Study on new radio access technology: Radio access architecture and interfaces (Release 14)", Technical Report, 3GPP TR 38.801 V14.0.0, Mar. 2017, pp. 1-91, 3GPP.

O-RAN Fronthaul Working Group, "Control, User and Synchronization Plane Specification", Technical Specification, O-RAN.WG4.CUS.0-v05.00, Nov. 12, 2021, pp. 1-291, O-RAN Alliance.

XRAN Fronthaul Working Group, "Control, User and Synchronization Plane Specification", Technical Specification, XRAN-FH.CUS.0-v01.00, Apr. 4, 2018, pp. 1-61, xRAN.

Park, S et al., "Joint Design of Fronthaul and Access Links for C-RAN With Wireless Fronthauling", IEEE Signal Processing Letters, Nov. 2016, pp. 1657-1661, vol. 23 No. 11, IEEE.

* cited by examiner

METHODS, BASE BAND UNIT SYSTEM AND RADIO UNIT OF A DISTRIBUTED BASE STATION SYSTEM ADAPTED FOR BEAMFORMING

TECHNICAL FIELD

The present disclosure relates generally to methods, baseband unit (BBU) systems, and radio units (RU) of a distributed base station system, adapted for beamforming. More specifically, the present disclosure deals with such methods, systems and units when the RU has a plurality of antennas for sending downlink (DL) signals and receiving uplink (UL) signals, such as in Multiple Input Multiple Output (MIMO) systems. The present disclosure further relates to computer programs and carriers corresponding to the above methods, systems and units.

BACKGROUND

In a centralized radio access network (C-RAN), also called a distributed base station system, radio access network (RAN), processing is conducted by two separate units: a radio unit (RU), and a base band unit (BBU). The BBU is connected to the RU via a fronthaul link. The RU may also be called remote radio unit (RRU). The base band unit may also be called base unit (BU) or digital unit or distributed unit (DU). The RU is connected to one or more antennas through which the RU wirelessly communicates with at least one user equipment (UE). The BBU is in its turn connected to other base station systems or base stations, and to a core network of a wireless communication system. The BBU is centralized and there is normally more than one RU connected to each BBU. Traditionally, the BBU performs advanced radio coordination features such as joint detection, joint decoding, coordinated multi-point transmission (CoMP), to increase the spectrum efficiency and network capacity, as well as baseband processing, whereas the RUs perform radio frequency (RF) processing and transmission/reception of the RF processed signals.

Originally, the RU was designed to reduce the cable loss of the coax cables between an antenna tower top where the actual antennas are situated and the bottom of the antenna tower where the base station functionality is hosted. Therefore, before $5^{th}$ Generation of mobile communication (5G), i.e. at 4G, e.g. Long Term Evolution (LTE), the RU was rather simple and was mainly doing RF processing with limited baseband processing, if any.

When going from 4G to 5G, there was a need to increase the wireless communication capacity towards the UEs in order to be able to deliver requested data amounts per time period in 5G. One enabler of the mobile evolution towards 5G is massive Multiple Input Multiple Output (MIMO) in which each RU has a plurality of antennas. In other words, massive MIMO exploits spatial multiplexing to improve spectrum efficiency by using antenna arrays at the RU, which antenna array is equipped with N antennas simultaneously serving K user-layers in the same time-frequency resource. The typical scenario is N>>K e.g., N is 64, 128 or 256 while K is 8 or 16. As shown, the number of antennas is quite large. Massive MIMO is often referred to as massive beamforming, which can form narrow beams and focus on different directions, mitigating against the increased path loss of higher frequency bands. It also benefits multi-user MIMO, which allows the transmissions from/to multiple UEs simultaneously over separate spatial channels resolved by the massive MIMO technologies, while keeping high capacity for each UE. Therefore, it can significantly increase the spectrum efficiency and cell capacity.

In 5G evolution and future $6^{th}$ Generation of mobile communication (6G), massive MIMO is expected to support even more antennas, given that the cost per transceiver chain would decrease over time. To address this trend, the MIMO processing is foreseen to be more distributed and scalable, where a larger MIMO system is processed by multiple RUs, each of which only processes a subset of antennas. With such a scalable design, the MIMO system can easily scale with respect to the number of antennas.

In the legacy Common Public Radio Interface type (CPRI-type) of time-domain fronthaul (FH), the BBU performs the beamforming and determines time domain IQ samples per antenna branch. The time-domain IQ samples per antenna branch are then transported, in DL, over the fronthaul link to the RUs.

As there are many antennas, i.e. antenna branches, in massive MIMO systems, the required FH link capacity increases dramatically as the number of antenna branches increases, driving the FH costs up significantly. To address this challenge, different lower-layer split (LLS) options have been adopted. The basic idea is to move the beamforming function to the RU and transport the samples or data of user layers in frequency domain over the FH link. In this way, the number of FH streams is reduced from the number of antennas N to the number of user layers K, remember that in the typical scenario N>>K. One LLS option is called 3GPP option 7-3 and is presented in 3GPP TR 38.801 V14.0.0, clause 11.1.2.7. In the 3GPP option 7-3, channel estimation of the radio channel between the RU and the UEs is done in the BBU, based on e.g. UL reference signals, as well as the calculation of beamforming weights (BFW) in frequency domain. The BFW in frequency domain are then sent over the FH to the RU. The BBU also performs Forward Error Correction (FEC) encoding and sends the coded bits of user-layers over the FH to the RU. The RU modulates the received user-layer signals and beamforms the user-layer signals into antenna signals using the BFW received from the BBU. The RU further transforms the antenna signals into time domain by using e.g. Inverse Fast Fourier Transformation (IFFT), and performs necessary RF processing before the antenna signals are transmitted wirelessly towards the UEs through the respective antennas of the antenna branches. Another LLS option is called O-RAN LLS and is presented inO-RAN.WG4.CUS.0-v04.00, O-RAN Fronthaul Working Group, Control, User and Synchronization Plane Specification. This option is very similar to the 3GPP option 7-3. The difference is that modulation is performed in the BBU instead of in the RU in O-RAN, such that the RU will obtain the modulated user-layer signals from the BBU. O-RAN defines two types of RUs, i.e. CAT-A RU and CAT-B RU, which are referred to as CAT-A O-RU and CAT-B O-RU, respectively, in O-RAN. For the CAT-A O-RU, the frequency-domain beamforming is implemented in the BBU, which is referred to as O-DU in O-RAN. For CAT-B O-RU, the frequency-domain beamforming is implemented in CAT-B O-RU. In O-RAN, the frequency-domain beamforming is referred to as precoding and beamforming in CAT-B O-RU. For CAT-A O-RU, the frequency-domain beamforming is referred to as precoding. Note that the BBU and the RU are referred to as O-DU and O-RU, respectively, in O-RAN. In eCPRI terminologies, the BBU and the RU are referred to as eREC (eCPRI Radio Equipment Control) and eRE (eCPRI Radio Equipment), respectively. In another terminology, the BBU and the RU may be referred to as LLS-CU and LLS-DU, respectively.

Although the above described LLS options reduce the amount of DL user-plane data to be sent over the FH, the BFWs that need to be sent in control plane creates high bursts over the FH, which is then the main driver to increase the FH peak rate. This is because the transmission window for transporting BFWs is very short. Therefore, it creates high bursts to transport so many BFWs in such a short time.

In international patent application WO2020/256609 of the same applicant, a scheme was proposed to reduce the number of BFWs transported over the FH. The idea described there is to split the BFWs into two parts. The BFWs of the second part are reduced significantly by doing a layer-specific beam selection. Then the BFWs of the first part are calculated based on the reduced BFWs of the second part. The amount of data of the two parts are much smaller than that without reduction, while the performance degradation is small. In WO2020/256609, the BBU sends the BFWs of both the first and second part to the RU. The RU then calculates, or combines, the BFWs based on the first and second parts received and then execute the beamforming using the combined BFWs.

However, WO2020/256609 addresses only a point-to-point FH topology, where each RU has a dedicated FH link to the BBU, as shown in FIG. 1. In the point-to-point FH topology example of a distributed base station system 10 as shown in FIG. 1, a first RU 30 is connected to a BBU 20 over a first FH link 25, a second RU 40 is connected to the BBU 20 over a second FH link 35 and third RU 50 is connected to the BBU 20 over a third FH link 45. The first, second and third RUs 30, 40, 50 are arranged to transmit and receive user-planer data as antenna signals to/from UEs 31, 32, 33. Such a point-to-point FH would need many fiber connections and the same number of BBU ports, even if those RUs are configured as a joint larger MIMO system.

In this disclosure on the other hand, a cascaded topology of RUs is addressed, as shown in FIG. 2. In a cascaded topology, a first RU 120 is connected to the BBU 110 over a fronthaul link 140 as in the point-to-point topology. However, the second RU 160 is then connected to the first RU 120 via a separate RU-RU link 165, and a third RU 170 is connected to the second RU 160 via another separate RU-RU link 175. Further, if there are any more RUs, they are in their turn connected to an RU, one after the other as in a line. In FIG. 2, there are only three RUs illustrated but there may be many more RUs in such a cascade-coupled topology. The cascaded RU deployment would reduce the amount of FH fiber links and the number of BBU ports to 1. This would help reduce the deployment costs, i.e. fiber connections and system complexity, i.e. BBU ports.

However, in the cascade-coupled topology, especially when using the methods described in WO2020/256609, the BFW bursts over the FH link 140 get even higher as all BFWs sent by the BBU towards all cascade-coupled RUs are sent over one and the same FH link 140. Thereby, the FH peak rate on the cascaded FH chain is further increased, especially on the FH link 140 between the BBU 110 and the first RU 120. Consequently, there is a need for a solution to handle distributed base station systems having RUs cascade-coupled to the BBU. Such a solution should preferably manage to keep the amount of data sent over the FH link low in total but also to keep the bursts of BFWs sent over the FH link on a manageable level.

SUMMARY

It is an object of the invention to address at least some of the problems and issues outlined above. It is possible to achieve these objects and others by using methods, network nodes and wireless devices as defined in the attached independent claims.

According to one aspect, a method is provided that is performed by a BBU system of a wireless communication network, the wireless communication network comprising a distributed base station system. The distributed base station system comprises a BBU, a first RU connected to the BBU over a fronthaul link, the first RU comprising N1 antennas, and a second RU connected to the first RU over an RU link, the second RU comprising N2 antennas. The method comprises determining a first portion of BFW in frequency domain, based on a DL channel estimate of the first RU, wherein the BFW are to be used for beamforming K user-layer DL signals to be sent to a number of UEs, the first portion of the BFW being determined for expanding, in frequency domain, the Kuser-layer signals to antenna signals of the N1 antennas of the first RU. The method further comprises determining a second portion of the BFW in frequency domain, based on a DL channel estimate of the second RU, the second portion of the BFW being determined for expanding, in frequency domain, the Kuser-layer signals to antenna signals of the N2 antennas of the second RU. The method further comprises determining a first part of the BFW in frequency domain, based on the DL channel estimates of the first RU and the second RU, wherein the first part of the BFW is determined for performing interference cancellation between the user-layer signals. Further, the method comprises triggering sending the first part of the BFW and the first and second portion of the BFW to the first RU, and triggering sending the K user-layer signals in frequency domain to the first RU.

According to another aspect, a method is provided that is performed by a first RU of a distributed base station system, the first RU comprising N1 antennas. The distributed base station system further comprises a BBU connected to the first RU over a fronthaul link and a second RU connected to the first RU over an RU link, the second RU comprising N2 antennas. The method comprises receiving, from the BBU, Kuser-layer DL signals in frequency domain, to be sent to a number of UEs. The method further comprises receiving, from the BBU, a first part of BFW, and a first and second portion of BFW for beamforming the Kuser-layer signals in frequency domain. The first portion is based on a determined DL channel estimate of the first RU, and the first portion is determined for expanding, in frequency domain, the user-layer signals to antenna signals of the N1 antennas of the first RU. The second portion is based on a determined DL channel estimate of the second RU, and the second portion is determined for expanding, in frequency domain, the user-layer signals to antenna signals of the N2 antennas of the second RU. The first part of the BFW is based on the determined DL channel estimates of the first RU and the second RU, and the first part of the BFW is determined for performing interference cancellation between the user-layer signals. The method further comprises determining BFW for the first RU based on the received first part and first portion of the BFW, sending, to the second RU over the RU link, the received first part and second portion of the BFW, and sending, to the second RU over the RU link, the received K user-layer DL signals in frequency domain. The method further comprises beamforming the received K user-layer signals into antenna signals, using the determined BFW for the first RU, and sending the antenna signals to the number of UEs via the N1 antennas.

According to another aspect, a method is provided that is performed by a BBU system of a wireless communication network, the wireless communication network comprising a distributed base station system comprising a BBU, a first RU connected to the BBU over a fronthaul link, the first RU comprising N1 antennas. The distributed base station system further comprises a second RU connected to the first RU over an RU link, the second RU comprising N2 antennas. The method comprises determining a first portion of BFW in frequency domain, based on an UL channel estimate of the first RU, wherein the first portion of BFW is to be used for combining, in frequency-domain, antenna signals received at the N1 antennas of the first RU from a number of UEs to K user-layer signals of the first RU. The method further comprises determining a second portion of the BFW in frequency domain, based on an UL channel estimate of the second RU, wherein the second portion of BFW are to be used for combining frequency-domain signals received at the N2 antennas of the second RU from the number of UEs to K user-layer signals of the second RU. The method further comprises determining a first part of the BFW in frequency domain based on the UL channel estimates of the first RU and the second RU, wherein the first part of the BFW is determined for performing interference cancellation between the user-layer signals of the first and the second RU, and triggering sending the first part of the BFW and the first and second portion of the BFW to the first RU.

According to another aspect, a method is provided that is performed by a first RU of a distributed base station system, the first RU comprising N1 antennas. The distributed base station system further comprises a BBU connected to the first RU over a fronthaul link and a second RU connected to the first RU over an RU link, the second RU comprising N2 antennas. The method comprises receiving, from a number of UEs, UL antenna signals at the N1 antennas, and receiving, from the BBU, a first part of BFW and a first and second portion of the BFW, the first portion being based on a determined UL channel estimate of the first RU, the first portion being determined for combining, in frequency-domain, the UL antenna signals received at the N1 antennas to user-layer signals, the second portion being based on a determined UL channel estimate of the second RU, the second portion being determined for combining, in frequency-domain, antenna signals received at the N2 antennas of the second RU to user-layer signals, the first part of the BFW being based on the determined UL channel estimates of the first RU and the second RU, and the first part of the BFW being determined for performing interference cancellation between the user-layer signals. The method further comprises determining BFW for the first RU based on the received first part and first portion of the BFW, sending, to the second RU over the RU link, the received first part and second portion of the BFW, and combining, in frequency domain, the received UL antenna signals at the N1 antennas into first K user layer signals, using the determined BFW for the first RU. The method further comprises receiving, from the second RU, second K user layer signals combined by the second RU from antenna signals received at the N2 antennas of the second RU from the number of UEs, the combining by the second RU being based on the sent first part and second portion of the BFW sent to the second RU by the first RU. The method further comprising combining the first and second K user layer signals into combined K user layer signals, and sending the combined K user layer signals to the BBU.

According to another aspect, a BBU system is provided that is configured to operate in a wireless communication network. The wireless communication network comprises a distributed base station system comprising a BBU, a first RU connected to the BBU over a fronthaul link, the first RU comprising N1 antennas. The distributed base station system further comprises a second RU connected to the first RU over an RU link, the second RU comprising N2 antennas. The BBU system also comprises a processing circuitry and a memory. Said memory contains instructions executable by said processing circuitry, whereby the BBU system is operative for determining a first portion of BFW in frequency domain, based on a DL channel estimate of the first RU, wherein the BFW are to be used for beamforming K user-layer DL signals to be sent to a number of UEs, the first portion of the BFW being determined for expanding, in frequency domain, the K user-layer signals to antenna signals of the N1 antennas of the first RU. The BBU system is further operative for determining a second portion of the BFW in frequency domain, based on a DL channel estimate of the second RU, the second portion of the BFW being determined for expanding, in frequency domain, the K user-layer signals to antenna signals of the N2 antennas of the second RU, and for determining a first part of the BFW in frequency domain, based on the DL channel estimates of the first RU and the second RU, wherein the first part of the BFW is determined for performing interference cancellation between the user-layer signals. The BBU system is further operative for triggering sending of the first part of the BFW and the first and second portion of the BFW to the first RU, and triggering sending of the K user-layer signals in frequency domain to the first RU.

According to another aspect, a first RU is provided that is configured to operate in a distributed base station system, the first RU comprising N1 antennas. The distributed base station system further comprises a BBU connected to the first RU over a fronthaul link and a second RU connected to the first RU over an RU link, the second RU comprising N2 antennas. The first RU comprises a processing circuitry and a memory. Said memory contains instructions executable by said processing circuitry, whereby the first RU is operative for receiving, from the BBU, K user-layer DL signals in frequency domain, to be sent to a number of UEs, and for receiving, from the BBU, a first part of BFW and a first and second portion of BFW for beamforming the K user-layer signals in frequency domain, the first portion being based on a determined DL channel estimate of the first RU, the first portion being determined for expanding, in frequency domain, the user-layer signals to antenna signals of the N1 antennas of the first RU, the second portion being based on a determined DL channel estimate of the second RU, the second portion being determined for expanding, in frequency domain, the user-layer signals to antenna signals of the N2 antennas of the second RU, the first part of the BFW being based on the determined DL channel estimates of the first RU and the second RU, and the first part of the BFW being determined for performing interference cancellation between the user-layer signals. The first RU is further operative for determining BFW for the first RU based on the received first part and first portion of the BFW, sending, to the second RU over the RU link, the received first part and second portion of the BFW, sending, to the second RU over the RU link, the received K user-layer DL signals in frequency domain, beamforming the received K user-layer signals into antenna signals, using the determined BFW for the first RU, and sending the antenna signals to the number of UEs via the N1 antennas.

According to another aspect, a BBU system is provided that is configured to operate in a wireless communication network. The wireless communication network comprises a distributed base station system comprising a BBU, a first RU connected to the BBU over a fronthaul link, the first RU comprising N1 antennas. The distributed base station system further comprises a second RU connected to the first RU over an RU link, the second RU comprising N2 antennas. The BBU system also comprises a processing circuitry and a memory. The memory contains instructions executable by the processing circuitry, whereby the BBU system is operative for determining a first portion of BFW in frequency domain, based on an UL channel estimate of the first RU, wherein the first portion of BFW is to be used for combining, in frequency-domain, antenna signals received at the N1 antennas of the first RU from a number of UEs to K user-layer signals of the first RU, and for determining a second portion of the BFW in frequency domain, based on an UL channel estimate of the second RU, wherein the second portion of BFW are to be used for combining frequency-domain signals received at the N2 antennas of the second RU from the number of UEs to K user-layer signals of the second RU. The BBU system is further operative for determining a first part of the BFW in frequency domain based on the UL channel estimates of the first RU and the second RU, wherein the first part of the BFW is determined for performing interference cancellation between the user-layer signals in the first and the second RU, and triggering sending the first part of the BFW and the first and second portion of the BFW to the first RU.

According to another aspect, a first RU is provided that is configured to operate in a distributed base station system, the first RU comprising N1 antennas. The distributed base station system further comprises a BBU connected to the first RU over a fronthaul link and a second RU connected to the first RU over an RU link, the second RU comprising N2 antennas. The first RU comprises a processing circuitry and a memory. The memory contains instructions executable by the processing circuitry, whereby the first RU is operative for receiving, from a number of UEs, UL antenna signals at the N1 antennas, and receiving, from the BBU, a first part of BFW, and a first and second portion of the BFW, the first portion being based on a determined UL channel estimate of the first RU, the first portion being determined for combining, in frequency-domain, the UL antenna signals received at the N1 antennas to user-layer signals, the second portion being based on a determined UL channel estimate of the second RU, the second portion being determined for combining, in frequency-domain, antenna signals received at the N2 antennas of the second RU to user-layer signals, the first part of the BFW being based on the determined UL channel estimates of the first RU and the second RU, and the first part of the BFW being determined for performing interference cancellation between the user-layer signals. The first RU is also operative for determining BFW for the first RU based on the received first part and first portion of the BFW, sending, to the second RU over the RU link, the received first part and second portion of the BFW, and combining, in frequency-domain, the received UL antenna signals at the N1 antennas into first K user layer signals, using the determined BFW for the first RU. The first RU is also operative for receiving, from the second RU, second K user layer signals combined by the second RU from antenna signals received at the N2 antennas of the second RU from the number of UEs, the combining by the second RU being based on the first part and second portion of the BFW sent to the second RU by the first RU, combining the first and second K user layer signals into combined K user layer signals, and sending the combined K user layer signals to the BBU.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
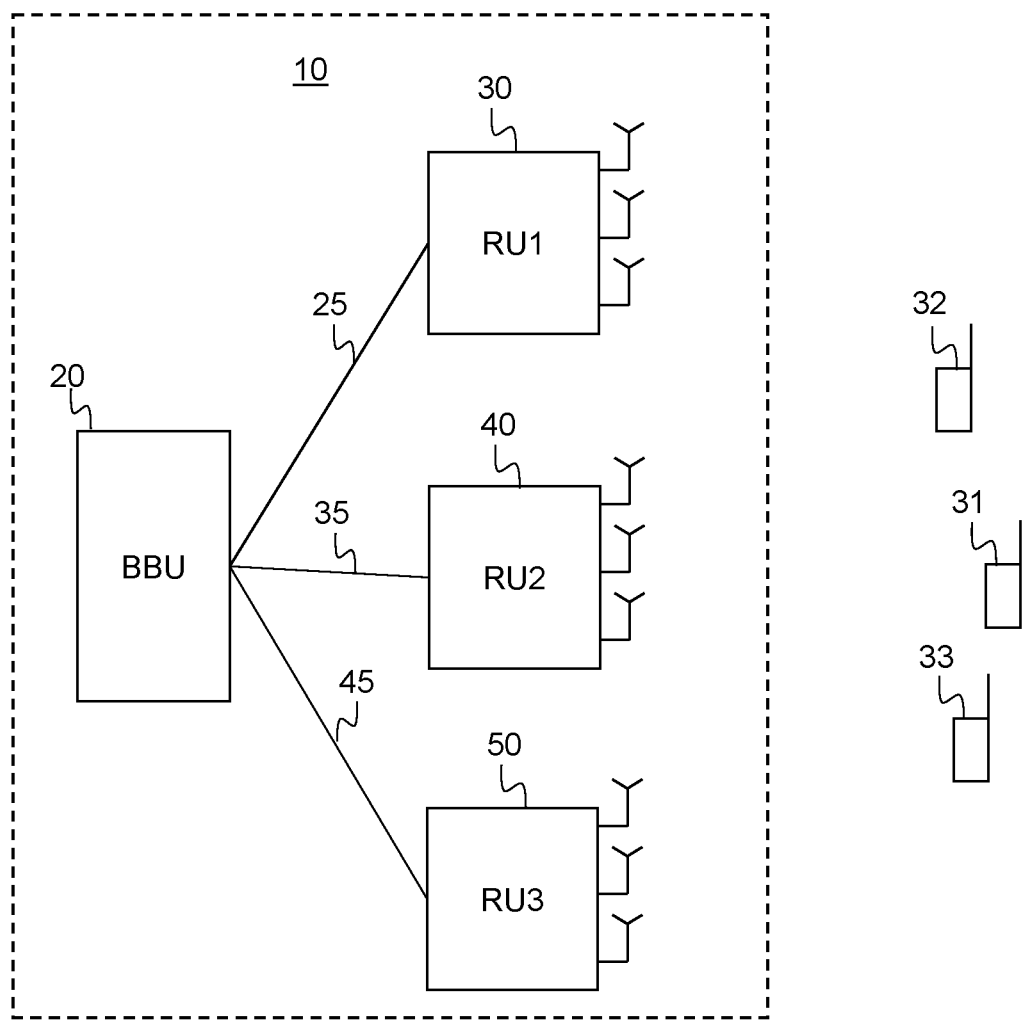
FIG. 1 is a block diagram illustrating a point-to-point topology of a distributed base station system comprising a plurality of RUs connected to a BBU.
Figure 2:
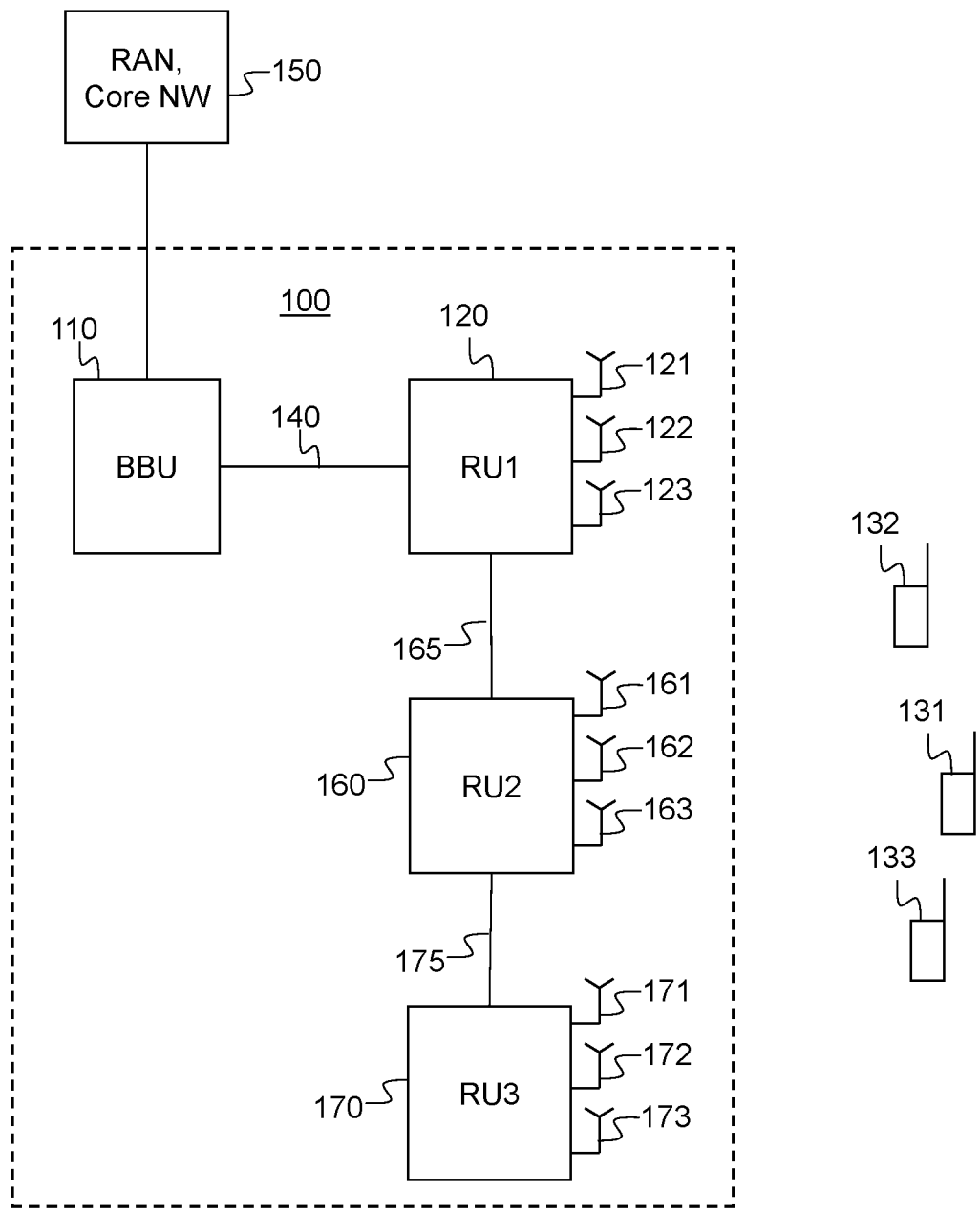
FIG. 2 is a block diagram illustrating a cascaded topology of a distributed base station system comprising a plurality of RUs connected to a BBU.

FIG. 2 illustrates a wireless communication network in which the present invention may be used. The wireless communication network comprises a distributed base station system 100, which in turn comprises a BBU 110 and a first RU 120. The BBU 110 has connections to other base station nodes or other RAN nodes and further to a core network (symbolized with 150 in FIG. 2) so that the distributed base station system 100 can communicate with other nodes of the communication network. The BBU 110 is connected to the first RU 120 via a fronthaul link 140. The fronthaul link 140 may be any kind of connection, such as a dedicated wireline or wireless connection or a connection via a network, as long as the connection fulfils fronthaul requirements, e.g. in capacity and latency. The first RU 120 further has a plurality of antennas 121, 122, 123 through which wireless signals are communicated towards and from one or more UEs 131, 132, 133. The wireless signals comprise data to be communicated from or to the UEs 131, 132, 133. The distributed base station system 100 further comprises a second RU 160 that is connected to the first RU 120 over an RU link 165. Observe that the second RU 160 has no direct connection to the BBU 110 but is connected to the BBU via the RU link 165, the first RU 120 and the fronthaul link 140. The second RU 160 further has a plurality of antennas 161, 162, 163 through which wireless signals are communicated towards and from the one or more UEs 131, 132, 133. The distributed base station system 100 may further comprise a third RU 170 that is connected to the second RU 160 over a second RU link 175. Observe that the third RU 170 has no direct connection to the BBU 110 but is connected to the BBU via the second RU link 175, the second RU 160, the RU link 165, the first RU 120 and the fronthaul link 140. The third RU 170 further has a plurality of antennas 171, 172, 173 through which wireless signals are communicated towards and from the one or more UEs 131, 132, 133. The distributed base station system 100 may comprise further RUs cascade-coupled onto the third RU 170 in a similar way.

The BBU 110 and the first 120, second 160, third RU 170 and any possible other RUs each comprise RAN functionality for handling the data and signals to be communicated between the BBU 110, the RUs 120, 160, 170 and the UEs 131, 132, 133. The RAN functionality is distributed between the BBU 110 and the RUs as will be described further down in this disclosure. It can be noted that in 3GPP, the BBU can be further split to two units called Distributed Unit (DU) and Central Unit (CU), where the DU is arranged to perform lower layer processing, e.g. L1 and L2 of the BBU, and the CU is arranged to perform higher layer processing of the BBU, e.g. L3 and higher.

The wireless communication network 100 may be any kind of wireless communication network that can provide radio access to wireless devices. Example of such wireless communication networks are networks based on Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation (5G) wireless communication networks based on technology such as New Radio (NR), and any possible future sixth generation (6G) wireless communication network.

The UEs 131, 132, 133 may be any type of communication device capable of wirelessly communicating with the RUs 120, 160, 170 using radio signals. For example, the UEs may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 3:
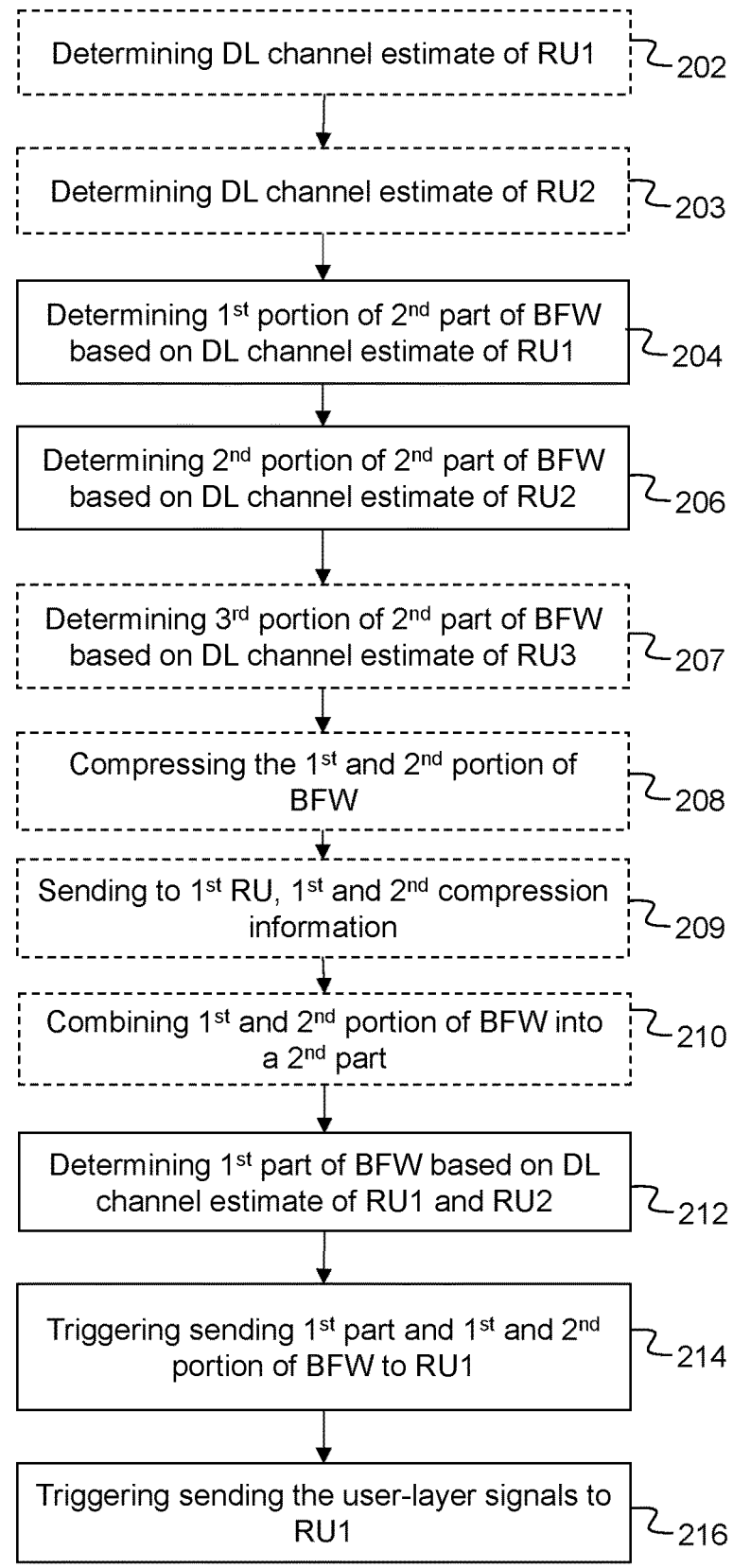
FIG. 3 is a flow chart illustrating a method performed by a BBU system for DL communication, according to possible embodiments.

FIG. 3, in conjunction with FIG. 2, describes a method performed by a BBU system of a wireless communication network, the wireless communication network comprising a distributed base station system 100. The distributed base station system 100 comprises a BBU 110, a first RU 120 connected to the BBU 110 over a fronthaul link 140, the first RU comprising N1 antennas 121, 122, 123, and a second RU 160 connected to the first RU 120 over an RU link 165, the second RU 160 comprising N2 antennas 161, 162, 163. The method comprises determining 204 a first portion of BFW in frequency domain, based on a DL channel estimate of the first RU 120, wherein the BFW are to be used for beamforming K user-layer DL signals to be sent to a number of UEs 131, 132, 133, the first portion of the BFW being determined for expanding, in frequency domain, the K user-layer signals to antenna signals of the N1 antennas 121, 122, 123 of the first RU 120. The method further comprises determining 206 a second portion of the BFW in frequency domain, based on a DL channel estimate of the second RU 160, the second portion of the BFW being determined for expanding, in frequency domain, the K user-layer signals to antenna signals of the N2 antennas 161, 162, 163 of the second RU 160. The method further comprises determining 212 a first part of the BFW in frequency domain, based on the DL channel estimates of the first RU 120 and the second RU 160, wherein the first part of the BFW is determined 212 for performing interference cancellation between the user-layer signals. Further, the method comprises triggering sending 214 the first part of the BFW and the first and second portion of the BFW to the first RU 120, and triggering sending 216 the K user-layer signals in frequency domain to the first RU 120.

The RU link 165 is a communication link or connection between two RUs, wherein only a first of the RUs has a direct link to the BBU. The RU link may also be called RU-RU link or RU-RU fronthaul link. The DL channel estimate of the first RU is an estimate of the communication channel between the UEs 131, 132, 133 and the first RU 120, and the DL channel estimate of the second RU is an estimate of the communication channel between the UEs 131, 132, 133 and the second RU 160. Even if one or more of the UEs seen from the first RU is not seen from the second RU or vice versa, the UEs 131, 132, 133 may all be considered to be connected to the respective RU, but in that case the channel estimates of the non-seen UEs from one RU is set to zero. The respective DL channel estimate is either determined based on channel measurements performed by the UEs on actual DL signals sent by the respective RU or, which is more common, the BBU determines an uplink (UL) channel estimate from UL signals sent from the UEs to the respective RU and uses known reciprocity of UL and DL.

As claimed, the first part of the BFW is determined 212 for performing interference mitigation/cancellation between the user-layer signals in the beamforming at the first and second RUs, and the first and second portion of the BFW, which together may be called a second part of the BFW, are determined 204, 206 for expanding the user-layer signals to antenna signals of the respective first and second RU. Beamforming weights (BFW) may also be called pre-coding coefficients, and the beamforming may also be called pre-coding.

The BFW may be determined as beam domain BFW or as antenna domain BFW, all in frequency domain. Antenna-domain or beam-domain are on top of frequency domain, i.e. antenna-domain or beam-domain BFW are applied to frequency domain user layer signals. In case the BBU system determines beam domain BFW, the BBU system may send the determined beam domain BFW to the RU and the RU transforms the beam-domain BFWs back to antenna-domain BFWs and then applies the antenna-domain BFWs to the user layer signals on one or a group of subcarrier(s) to the N1 antennas. Alternatively, the RU receives the beam domain BFW from the BBU system and applies the beam-domain BFWs to the user layer signals and then transform the beamformed beam-domain signals back to antenna-domain signals on the one or group of subcarrier(s) to the N1 antennas. Still alternatively, the BBU system determines the beam domain BFW, transforms the determined beam-domain BFWs to antenna-domain BFWs, and then sends the antenna-domain BFWs to the RU. The RU applies the antenna-domain BFWs to the user layer signals on the one or group of subcarrier(s) to the N1 antennas.

When using a cascade-coupled topology for connecting the RUs to the BBU, as described above, there will be a high load on the fronthaul link 140 between the BBU 110 and the first RU 120 in the cascade, as the BFW for all RUs (here the first RU 120 and the second RU 160) as well as the user data for all RUs are to be sent over the fronthaul link 140 to the first RU 120. According to the invention, the BFW for the RUs are decomposed into a first part that is common to the cascaded RUs and a second part that is determined separately for each of the cascaded RUs. The first part is sent only once from the BBU 110 to the first RU 120. The first RU 120 copies the common first part of the BFW and sends it further to the following RUs 160. The second part with its RU specific portions is on the other hand sent over the fronthaul link 140 to the first RU 120 so that the first RU 120 can receive its own portion, called first portion, and send the other portions of the second part further to the following RUs 160. By such a separation of the BFW into such a first part of BFW that is common for both the first RU 120 and the second RU 160 (as well as for any other subsequent cascade-coupled RUs), the first part of BFW only needs to be sent once over the fronthaul link. As a result, less data is sent over the fronthaul link compared to sending separate BFWs for each RU, as compared to WO2020/256609.

The BBU system of the wireless communication network that performs the method may be the BBU 110, a unit in the BBU or in the distributed base station system. Alternatively, the BBU system that performs the method may be arranged in or at any other network node of the communication network, such as a node further away from the UEs, e.g. another network element in the RAN or close to the RAN or another RAN node. In this alternative, and in the cloud-solution embodiment discussed below, the BBU 110 receives, from the first and the second RU 120, 160, respectively, uplink signals, e.g. reference signals such as SRS or DMRS, which the RUs have received from the UEs, or information related to those uplink signals, and communicates the uplink signals/information to the other network node that determines the DL channel estimate of each RU, and from the respective DL channel estimate determines the first and second part of the BFW as shown above. The other network node then sends the determined first and second part of the BFW back to the BBU 110 for further distribution to the first RU 120. Alternatively, the system of the wireless communication network that performs the method may be a group of network nodes, wherein functionality for performing the method is spread out over different physical, or virtual, nodes of the network. The latter may be called a "cloud-solution".

According to an embodiment, the method further comprises compressing 208 the first portion and the second portion of the BFW to a higher degree than any compression of the first part of the BFW. The compression 208 is performed before the first and second portion of the BFW are sent over the fronthaul link 140 to the first RU 120. The first part of beamforming for interference mitigation or cancellation has proven to be rather sensitive to the accuracy of the BFW whereas the first and second portion, also called second part of BFW for expanding user-layer signals to antenna signals is comparatively robust. In other words, the second part of BFW is less sensitive to the errors e.g. due to lossy compression compared to the first part of BFW. Based on this understanding, the second part of BFW (i.e. the first and second portion) are more compressed before they are sent to the first RU than the first part of BFW in order to save fronthaul link capacity, and without losing any noticeable accuracy of the beamformed signal due to their robustness. Hereby, even less data needs to be sent over the fronthaul link 140 compared to the above embodiment, without significant performance loss. That the first and second portion of BFW are compressed to a higher degree than any compression of the first part of BFW means that there is a stronger compression of the first and second portion of BFW than of the first part of BFW. The term "compression to a higher degree" intends to cover "compression with fewer bits" as well as "compression by selecting only a subset of BFW". "Compression to a higher degree" further signifies "more lossy compression".

According to another embodiment, the first part of the BFW is determined 212 based on the DL channel estimate of the first RU 120, the DL channel estimate of the second RU 160 and also on the compressed first and second portion of the BFW. Hereby an even better determination of the first part of the BFW is achieved, as the first part of the BFW can even mitigate the interferences caused by any inaccuracy due to compression of the first and second portion of the BFW. At the same time, the amount of data sent over the fronthaul link is kept on a low level.

According to another embodiment, the first and second portion of the BFWs are compressed 208 by selecting only a subset of the determined 204, 206 first and second portion of the BFWs, the subset being a number of BFW with largest magnitude for each user-layer signal. Further, the triggering sending 214 of the compressed first and second portion of the BFW to the first RU 120 implies sending the selected subset of the first and second portion of the BFW to the first RU. The selected subset can be sent as only sending the values of the selected subset as well as a bitmask indicating the selected entries in the original matrix of the second part of the BFW. When the first and second portions are combined into one matrix, the bitmask has similarly arranged first and second portions. For example, the bitmask maps to beam or antenna branch/element for different user layers. For each user layer and N1/N2 antennas/beams, the bitmask is N1/N2 bit per layer with "1" representing selected beam/antenna and "0" representing unselected beam/antenna. The number of BFW with largest magnitude may correspond to one or more of the strongest channel components or coefficients. Often, the energy for one user-layer is more concentrated in some channel coefficients than in others. For example, and especially, when the channel estimation is in the beam domain, such compression would be rather effective. A channel coefficient is a complex number, representing the channel attenuation and phase shift. In antenna element domain, it means the channel attenuation and phase shift from one transmit antenna to one receive antenna. In the beam domain, it means the channel attenuation and phase shift from one transmit beam, i.e. one transmit beam to one receive antenna. The beams are usually predefined by a number of directive beams pointing to different directions in the covered angles. Such beams can be obtained by using the Discrete Fourier Transform (DFT) base functions.

According to an alternative to the above embodiment, the first and second portions of the BFW are compressed 208 by using fewer bits for representing individual BFW than a number of bits used for the first and second portion before the compression 208. It is possible to compress in this way as the first and second portion of BFW are not as sensitive to errors as the first part of the BFW. Fewer bits for one beamforming weight may be using fewer quantization levels for describing one beamforming weight sample. Further, the first and second portions of the BFW may be represented by Block floating point or Block scaling, which have proven to be efficient quantization schemes with fewer bits.

According to an embodiment, the method further comprising sending 209, to the first RU 120, first compression information on the compression 208 of the first portion of the BFW and second compression information on the compression 208 of the second portion of the BFW, the first and second compression information being for decompression at the first and second RU, respectively. This compression information contains information on how the compression was done so that the first RU and the second RU can decompress/reconstruct the compressed first and second portion of BFW, respectively. The compression information may be the bitmask mentioned earlier, which indicates which bits that were sent when only a subset of the determined 204, 206 first and second portion of the BFW were selected. When the first and second portions of the BFWs were compressed by using fewer bits, compression information may or may not be needed to send over the FH.

According to another embodiment, the method further comprises combining 210 the first portion and the second portion of the BFW into a second part of the BFW. The compression 208 can be done individually for the first portion, i.e. for the first RU, and the second portion, i.e. for the second RU, respectively, of the second part of BFW, i.e. before the combining, or the compression 208 may be done after the first and second portion have been combined 210. "Combining" here refers to putting the first and second portions of the BFWs into a matrix that is larger than each of matrices describing each of the first and second portion of the second part of BFW. The larger matrix represents the whole second part of the BFW. The larger matrix formulation facilitates the calculation of the first part of the BFW, when based on the first and second portion.

According to yet another embodiment, the method further comprises determining 202 the DL channel estimate of the first RU 120 based on UL signals originating from the number of UEs 131, 132, 133 and received at the antennas 121, 122, 123 of the first RU 120, and determining 203 the DL channel estimate of the second RU 160 based on UL signals originating from the number of UEs 131, 132, 133 and received at the antennas 161, 162, 163 of the second RU 160. For wireless communication networks based on technology that is reciprocal in the air, such as Time -Division Duplex (TDD)-based technologies, the DL channel estimate can be determined rather accurate from UL signals. When channel estimation is accurate, e.g. when SINR is high, such an approach performs even better than a codebook-based approach. In TDD for example, any difference between UL and DL channel is mainly from the radio frontend difference in UL and DL, which difference can be calibrated out. The UL signals may be reference signals originating from the number of UEs, such as sounding reference signal (SRS) and demodulation reference signal (DMRS) etc. The reference signals may be the same reference signals from the UEs or different signals. They may be sent simultaneously or at different times.

According to yet another embodiment, the method further comprises normalizing the first part and the first and second portion of the BFW, and sending, to the first RU 120, information on a scaling factor per user layer relating to the normalization.

According to still another embodiment, the distributed base station system 100 further comprises a third RU 170 connected to the second RU 160 via a second RU link 175, the third RU 170 comprising N3 antennas 171, 172, 173. Further, the method comprises determining 207 a third portion of the BFW in frequency domain based on a determined DL channel estimate of the third RU 170, the third portion of the BFW being determined for expanding, in frequency domain, the K user-layer signals to antenna signals of the N3 antennas 171, 172, 173 of the third RU 170. Further, the triggering sending 214 of the first part of the BFW and the first and second portion of the BFW to the first RU 120 further comprises triggering sending the third portion of the BFW to the first RU 120.

Figure 4:
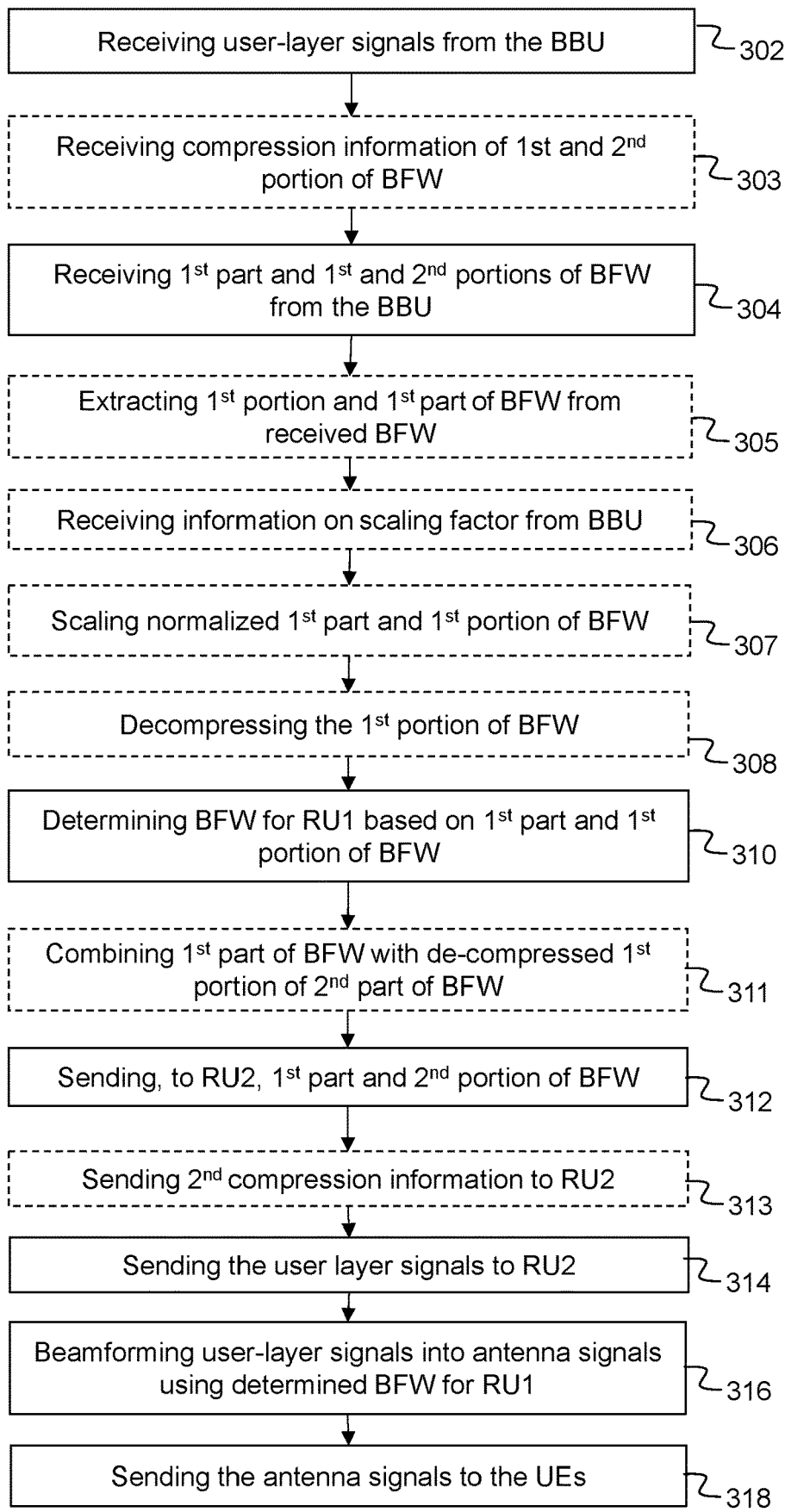
FIG. 4 is a flow chart illustrating a method performed by a first RU for DL communication, according to possible embodiments.

FIG. 4, in conjunction with FIG. 2, describes a method performed by a first RU 120 of a distributed base station system 100, the first RU 120 comprising N1 antennas 121, 122, 123. The distributed base station system 100 further comprises a BBU 110 connected to the first RU 120 over a fronthaul link 140 and a second RU 160 connected to the first RU 120 over an RU link 165, the second RU comprising N2 antennas. The method comprises receiving 302, from the BBU 110, K user-layer DL signals in frequency domain, to be sent to a number of UEs 131, 132, 133. The method further comprises receiving 304, from the BBU 110, a first part of BFW, and a first and second portion of BFW for beamforming the K user-layer signals in frequency domain. The first portion is based on a determined DL channel estimate of the first RU 120, and the first portion is determined for expanding, in frequency domain, the user-layer signals to antenna signals of the N1 antennas 121, 122, 123 of the first RU 120. The second portion is based on a determined DL channel estimate of the second RU 160, and the second portion is determined for expanding, in frequency domain, the user-layer signals to antenna signals of the N2 antennas 161, 162, 163 of the second RU 160. The first part of the BFW is based on the determined DL channel estimates of the first RU 120 and the second RU 160, and the first part of the BFW is determined for performing interference cancellation between the user-layer signals. The method further comprises determining 310 BFW for the first RU based on the received first part and first portion of the BFW, sending 312, to the second RU 160 over the RU link 165, the received first part and second portion of the BFW, and sending 314, to the second RU 160 over the RU link 165, the received K user-layer DL signals in frequency domain. The method further comprises beamforming 316 the received K user-layer signals into antenna signals, using the determined BFW for the first RU 160, and sending 318 the antenna signals to the number of UEs 131, 132, 133 via the N1 antennas 121, 122, 123.

By such a method it is possible for the first RU to receive and use BFW adapted to the first RU and to send BFW adapted for later cascaded RUs, i.e. RU2, to the later cascaded RUs. As the first part of BFW is only sent once over the fronthaul link even though it is used for all RUs cascade-connected to the BBU, capacity of the FH link is saved. The determination 310 of BFW for the first RU is normally performed by multiplying the first part of the BFW with the first portion of the BFW. When the first part and the first portion of the BFW are matrices, the multiplication is a matrix multiplication. The first and second RU may be realized as separate RUs on different Printed Circuit Boards (PCB). Alternatively, the first and second RU may be realized as different radio processors on one single PCB.

According to an embodiment, the method further comprises extracting 305 the first portion and the first part of the BFW from the received first part and the first and second portion of BFW. The extracting 305 may be performed so that when the first and second portion are combined into a common matrix, the first RU extracts the part of the matrix that belongs to the first portion. For example, the common matrix is a four-column matrix in which the two first columns belong to the first portion and the two last columns belong to the second portion of the BFW. Then the first RU uses or extracts the first two columns and sends the remaining two columns to the second RU. In another alternative, the extracting may be performed so that if the first and second portions are sent in different messages, the first RU will take the message containing the first portion of BFW and send the message with the second portion further to the second RU. Hereby, it is possible for the first RU to only use the BFW determined for it and to send, or forward, the second portion that it has not used, and the first part that both the first and second RU uses, to the second RU.

According to an embodiment, the method further comprises decompressing 308 the first portion of the BFW when the first portion of the BFW was compressed at the BBU. This step is performed when the BBU compressed the first portion of the BFW to a higher degree than any compression of the first part of the BFW. The decompression may be a dequantization or a reconstruction by filling zeros in a matrix according to a bitmask received (see below). In case of dequantization, the first RU needs information about the format used, such as compression scheme and any configuration parameters. The format used is usually pre-configured such that the BBU and the first RU know the format beforehand.

According to another embodiment, the method further comprises receiving 303, from the BBU 110, first compression information on compression of the first portion of the BFW and second compression information on compression of the second portion of the BFW, the first and second portion of the BFW being compressed by the BBU to a higher degree than any compression of the first part of the BFW, wherein the decompressing 308 of the first portion of the BFW is performed according to the first compression information. The method further comprises sending 313 the second compression information to the second RU 160 over the RU link 165. The first and second compression information may be a bitmask. This is applicable when the first and second portion of the BFW were compressed at the BBU by for example selecting only a subset of a determined first and second portion of the BFW, the subset being a number of strongest BFW for each user-layer signal.

According to another embodiment, in which the received 304 first part and the first and second portion of the BFW are normalized, the method further comprises receiving 306, from the BBU, information on a scaling factor per user-layer relating to the normalization and scaling 307 the received normalized first part and first portion of the BFW according to the information on the scaling factors before the beamforming 316. The received first part and first and second portion of the BFW are normalized by the BBU according to a scaling factor per user-layer that may be different to the scaling factor that the first RU uses for the scaling 307.

According to an alternative, the method further comprises sending the information on the scaling factor per user-layer to the second RU 160. Hereby, also the second RU can scale the first part and second portion of the BFW.

According to yet another embodiment, the distributed base station system 100 further comprises a third RU 170 connected to the second RU 160 over a second RU link 175, the third RU 170 comprising N3 antennas 171, 172, 173. The receiving 304 of BFW further comprises receiving a third portion of the BFW, determined based on a DL channel estimate for the third RU 170 for expanding, in frequency domain, the user-layer signals to antenna signals of the N3 antennas 171, 172, 173 of the third RU 170, and the first part of the BFW is based on DL channel estimates for the first RU 120, the second RU 160 and the third RU 170. The method further comprises sending, to the second RU 160 over the RU link 165, the third portion of the BFW for further transmission to the third RU 170 over the second RU link 175.

Figure 5:
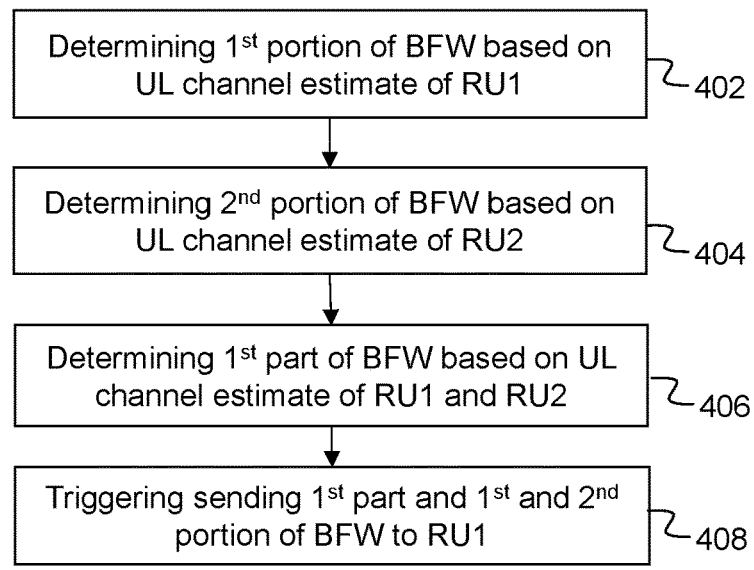
FIG. 5 is a flow chart illustrating a method performed by a BBU system for UL communication, according to possible embodiments.

FIG. 5, in conjunction with FIG. 2, describes a method performed by a BBU system of a wireless communication network, the wireless communication network comprising a distributed base station system 100 comprising a BBU 110, a first RU 120 connected to the BBU 110 over a fronthaul link 140, the first RU comprising N1 antennas 121, 122, 123. The distributed base station system 100 further comprises a second RU 160 connected to the first RU 120 over an RU link 165, the second RU 160 comprising N2 antennas 161, 162, 163. The method comprises determining 402 a first portion of BFW in frequency domain, based on an UL channel estimate of the first RU 120, wherein the first portion of BFW is to be used for combining, in frequency-domain, antenna signals received at the N1 antennas of the first RU 120 from a number of UEs 131, 132, 133 to K user-layer signals of the first RU. The method further comprises determining 404 a second portion of the BFW in frequency domain, based on an UL channel estimate of the second RU 160, wherein the second portion of BFW are to be used for combining frequency-domain signals received at the N2 antennas of the second RU 160 from the number of UEs 131, 132, 133 to K user-layer signals of the second RU. The method further comprises determining 406 a first part of the BFW in frequency domain based on the UL channel estimates of the first RU 120 and the second RU 160, wherein the first part of the BFW is determined for performing interference cancellation between the user-layer signals of the first and the second RU, and triggering sending 408 the first part of the BFW and the first and second portion of the BFW to the first RU 120.

This method at the BBU is similar to the method at the BBU of earlier embodiments, however, this method is adapted to UL communication of signals, whereas the previous embodiments were adapted to DL communication of signals. The advantages etc. are similar as for the DL communication of signals. Furthermore, the embodiments mentioned earlier in this disclosure in connection with FIG. 3 are applicable also for this scenario of UL communication of signals.

Figure 6:
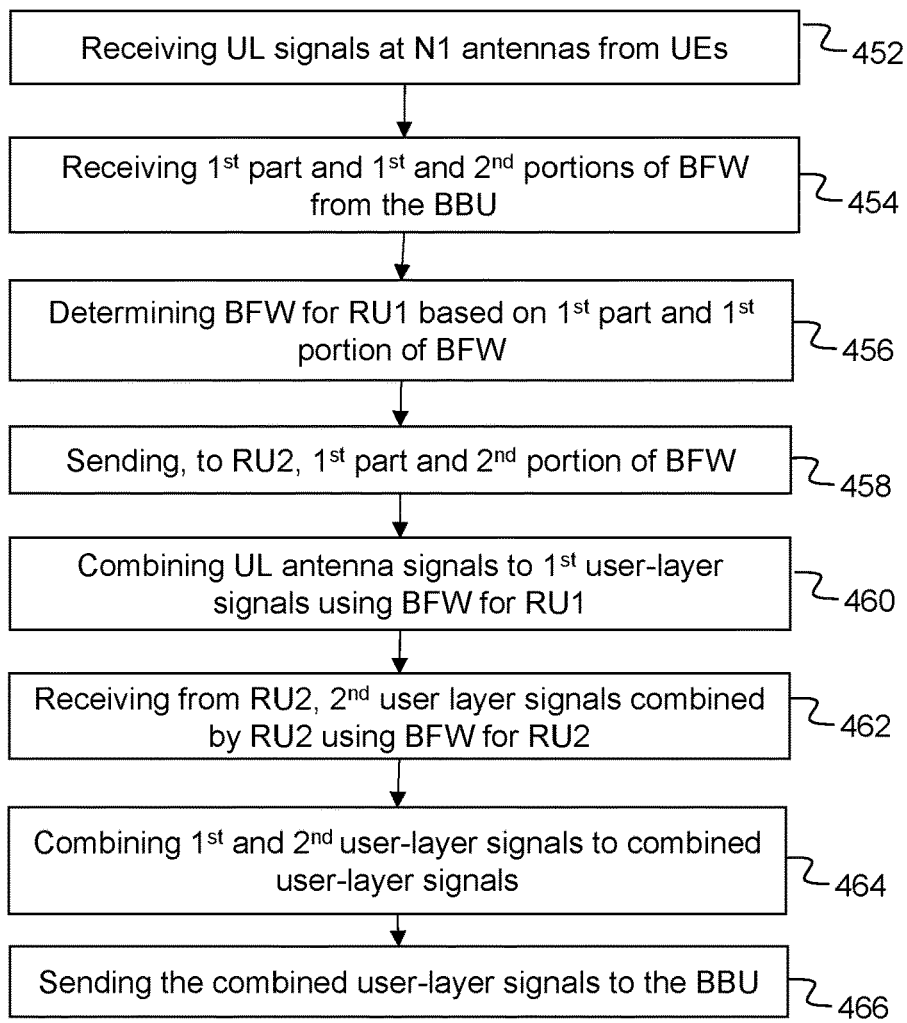
FIG. 6 is a flow chart illustrating a method performed by a first RU for UL communication, according to possible embodiments.

FIG. 6, in conjunction with FIG. 2, describes a method performed by a first RU 120 of a distributed base station system 100, the first RU 120 comprising N1 antennas 121, 122, 123. The distributed base station system 100 further comprises a BBU 110 connected to the first RU 120 over a fronthaul link 140 and a second RU 160 connected to the first RU 120 over an RU link 165, the second RU comprising N2 antennas 161, 162, 163. The method comprises receiving 452, from a number of UEs 131, 132, 133, UL antenna signals at the N1 antennas, and receiving 454, from the BBU 110, a first part of BFW and a first and second portion of the BFW, the first portion being based on a determined UL channel estimate of the first RU 120, the first portion being determined for combining, in frequency-domain, the UL antenna signals received at the N1 antennas to user-layer signals, the second portion being based on a determined UL channel estimate of the second RU 160, the second portion being determined for combining, in frequency-domain, antenna signals received at the N2 antennas of the second RU 160 to user-layer signals, the first part of the BFW being based on the determined UL channel estimates of the first RU 120 and the second RU 160, and the first part of the BFW being determined for performing interference cancellation between the user-layer signals. The method further comprises determining 456 BFW for the first RU based on the received first part and first portion of the BFW, sending 458, to the second RU 160 over the RU link 165, the received first part and second portion of the BFW, and combining 460, in frequency domain, the received UL antenna signals at the N1 antennas into first K user layer signals, using the determined BFW for the first RU 120. The method further comprises receiving 462, from the second RU 160, second K user layer signals combined by the second RU from antenna signals received at the N2 antennas of the second RU 160 from the number of UEs 131, 132, 133, the combining by the second RU being based on the sent first part and second portion of the BFW sent to the second RU by the first RU. The method further comprising combining 464 the first and second K user layer signals into combined K user layer signals, and sending 466 the combined K user layer signals to the BBU 120.

This method performed by the first RU 120 is adapted to UL communication of signals, whereas the embodiments described in connection with FIG. 4 were adapted to DL communication of signals. The combining performed by the first portion of the beamforming weights of the antenna signals to user layer signals may be performed by pre-equalizing the antenna signals, which actually does the combining. This combining/pre-equalizing may perform coherent combining, e.g. maximum ratio combining. Further, by combining 464 of the already combined or pre-equalized first and second K user layer signals into combined K user layer signals, only one set of combined signals is sent through the base station system over the fronthaul link 140 to the BBU 110 for all RUs that are cascade coupled. Hereby, the usage of the capacity of the fronthaul connection can be kept low. Furthermore, the embodiments mentioned earlier in this disclosure in connection with FIG. 4 are applicable also for this scenario of UL communication of signals.

In the following, a system model for DL reciprocity-based beamforming according to an embodiment is described. For DL in both 3GPP option 7-3 and Cat-B O-RUs in O-RAN architecture (where the beamforming is conducted in the RU), channel estimation and BFW calculation are performed in the BBU system while beamforming is executed in the RU. In the cascaded RU case, which is dealt with in this invention, the calculated BFWs need to be transported from the BBU system to the first RU via the fronthaul link. The first RU extracts its corresponding BFWs and then forwards the remaining BFWs to the next RU, i.e. the second RU. This process is repeated at each RU in the cascaded chain until the BFWs reach the last RU. This is normally done in the control plane of the fronthaul interface/link. Meanwhile, the user-layer data of multiple layers, e.g. the user-layer coded bits in 3GPP option 7-3 or the compressed modulation symbols in O-RAN, are normally transported in the data plane from the BBU to each RU in the same way, i.e. through the cascade via the first RU. Each RU in the cascaded chain converts the received user-plane data to modulated symbols, applies the received BFWs directed to the certain RU on the modulated symbols of the multiple layers, and then converts the beamformed symbols to analog signals to transmit at the different antennas wirelessly towards the UEs.

Now consider the scenario with K user layers (i.e. UEs to receive the user data) in a desired cell. There are L RUs in the local area cascaded in a daisy chain, which effectively form a large antenna array. The first RU (RU 1) is the one with fronthaul interface connecting to the BBU. RU l for l=1, ..., L perceives the DL channel towards the K UEs as $H_l \in \mathbb{C}^{K \times N_l}$ where $N_l$ is the number of antennas equipped at RU l. The effective large antenna array has therefore $\sum_{l=1}^{L} N_l$ antenna elements in total. The corresponding effective DL channel estimation comprising L RUs will be $$H = [H_1 \ldots H_L] \in \mathbb{C}^{K \times \sum_{l=1}^{L} N_l}$$

Consider that reciprocity-assisted transmission (RAT) is conducted regarding the effective antenna array. BFWs for a zero-forcing (ZF)-based method can be expressed as $$P_{ZF} = \underbrace{H^*}_{P_2} \underbrace{(HH^*)^{-1}}_{P_1}, \quad (1)$$

whereas BFWs for a minimum mean squared error (MMSE)-based method can be expressed as $$P_{MMSE} = \underbrace{H^*}_{P_2} \underbrace{(HH^* + \sigma^2 I)^{-1}}_{P_1} \quad (2)$$

where $\sigma^2$ is a measure of interference and noise (or error terms) and I is a K×K identity matrix. Then the BFWs are divided into a first part $P_1$ and a second part $P_2$ and the BFWs are generally written as $P=P_2 P_1$, where the first part $P_1$ is a common part for all L RUs, and the second part $P_2 = H^* = [(H^*_1)^T \ldots (H^*_L)^T]^T$ contains the respective coefficient part specific for each of the L RUs. The first part $P_1$, which performs interference pre-mitigation between user-layers, is composed by K×K complex values. The second part $P_2 = [P_{2,RU\ 1}^T \ldots P_{2,RU\ l}^T \ldots P_{2,RU\ L}^T]^T$ contains distinct coefficients for each RU, in which the coefficient $P_{2,Ru\ l} = H^*_l$ expands signals of different user layers pre-combined by $P_1$ to transmit signals in antenna-elements or beam directions at the RU-l. Accordingly, the BFWs for RU l can be written as $P_{RU\ l} = P_{2,RU\ l} P_1$. Therefore, the transmitted signal of RU l after beamforming can be expressed as $$y_l = P_{RU\ l} x = P_{2,RU\ l} P_1 x$$

where $x=[x_1, x_2 \ldots x_K]^T$ denotes the signal vector in which each element $x_i$ represents the modulated symbols of layer i and $$y_l = \begin{bmatrix} y_{l_1} & y_{l_2} & \cdots & y_{l_{N_l}} \end{bmatrix}^T$$

denotes the transmitted signal vector of RU l, in which each element $y_{l_i}$ represents the transmitted symbols of antenna i or beam i of RU l.

Then, according to one embodiment, the DL BFWs are compressed. The BFWs in P are composed of $(\sum_{l=1}^{L} N_l) \times K$ complex values. If each complex value is represented by Q bits, transporting P directly requires $(\sum_{l=1}^{L} N_l) \times K \times Q$ bits at the fronthaul link. This invention transports $P_1$ and $P_2$ respectively from the BBU to the first RU. Two different embodiments to compress $P_2$ at the BBU are provided such that the total required bits of transporting $P_1$ and $P_2$ can be reduced significantly comparing to transporting P directly.

Figure 7:
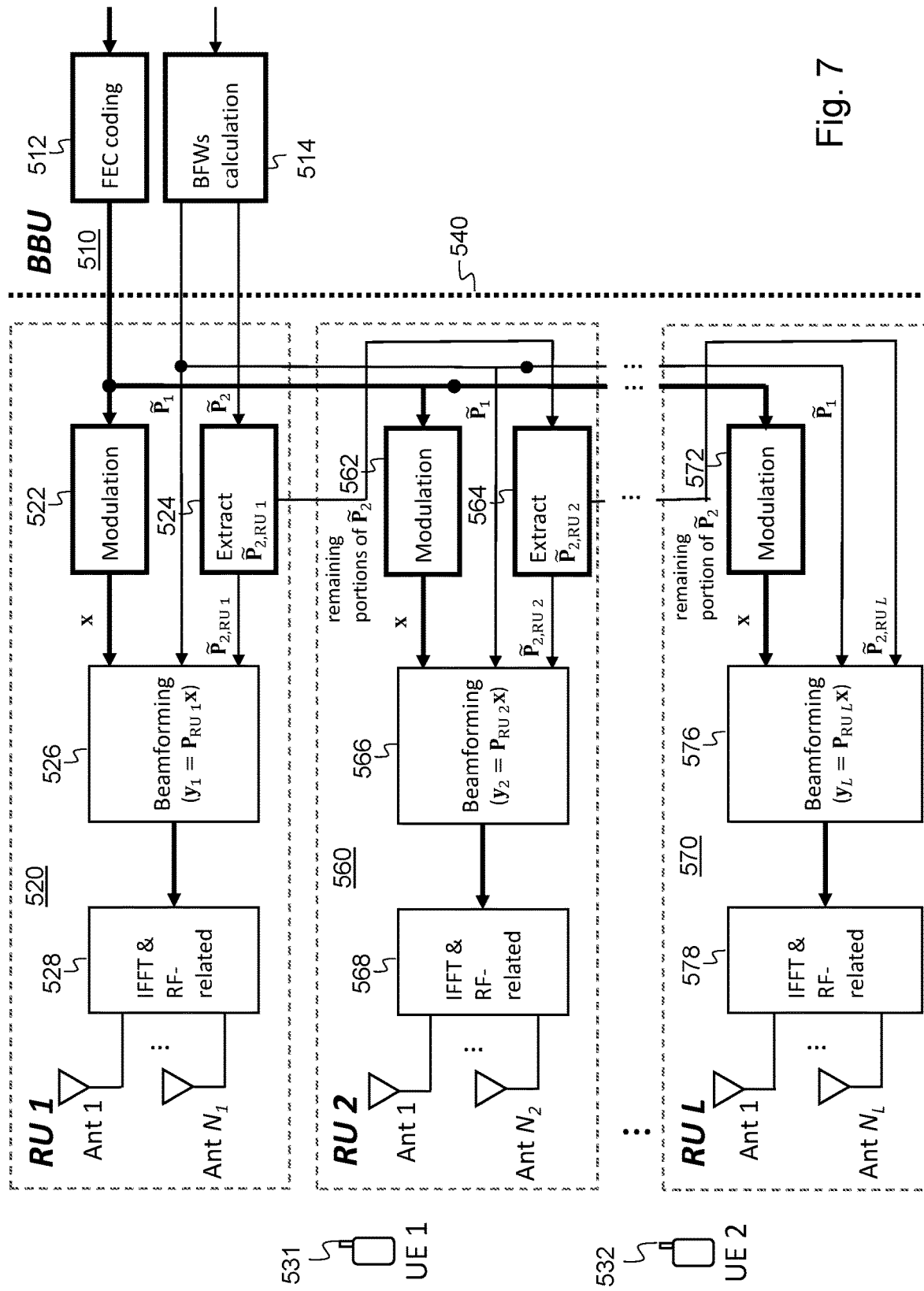
FIG. 7 is a block diagram in more detail of a possible realization of a distributed base station system for DL communication according to the present invention.

A block diagram of a distributed base station having one BBU 510 and l RUs 520, 560, 570 cascade-coupled to the BBU 510, according to an embodiment is shown in FIG. 7 with respect to a 3GPP option 7-3 architecture. Further down, details regarding operation at the BBU 510 and the cascaded RUs 520, 560, 570, respectively, will be described.

The BBU 510 comprises a Forward Error Correction (FEC) coding unit for coding user-layer signals to be transported DL over the fronthaul link 540 towards the RUs 520, 560, 570. The BBU 510 further comprises a BFWs calculation unit 514 for determining or calculating the BFWs for each RU. The BFW calculation unit 514 may alternatively be situated in a BBU system that may situated somewhere else than in the BBU, such as implemented as a cloud solution.

A first embodiment for compressing the second part of BFWs $P_2$ at the BBU is a so-called layer-specific selection of BFW. In this embodiment, before calculating the first and second part of the BFW, i.e. $P_1$ and $P_2$, the channel coefficients may be transformed into beam/direction domain if the channel is not estimated in beam/direction domain. Then the second part of the BFW $P_2$ is determined as separate parts for each RU:

$$P_2 = [P_{2,RU\ 1}^T \ldots P_{2,RU\ l}^T \ldots P_{2,RU\ L}^T]^T \text{ where } P_{2,RU\ l} = H^*_l$$

Compressed second part of BFW $\tilde{P}_2$ is determined as follows: $\tilde{P}_2$ is obtained by keeping $\overline{M}$ selected entries of each column of $P_2$ and setting the unselected entries to 0s. The selected $\overline{M}$ entries of each column of $P_2$ are the entries with the largest amplitude (absolute value), which corresponds to the strongest channel coefficients for this layer. Effectively, for the compressed BFWs of each RU, $\tilde{P}_{2,RU\ l}^T$, it has corresponding $M_l$ non-zero entries of each column and the rest of the entries are zeroes, where $0 \leq M_l \leq N_l$ and $\overline{M} = \Sigma_{l=1}^L M_l$. The compressed $\tilde{P}_2$ can be expressed as $$\tilde{P}_2 = [\tilde{P}_{2,RU\ 1}^T \ldots \tilde{P}_{2,RU\ l}^T \ldots \tilde{P}_{2,RU\ L}^T]^T.$$

The common first part of the BFW $P_1$ is then calculated according to $\tilde{P}_2$ based on Eqs. (1) or (2), depending on whether the ZF-method or the MMSE-method is used. For the ZF-based method, $\tilde{P}_1 = (H\tilde{P}_2)^{-1}$. For the MMSE-based method, $\tilde{P}_1 = (H\tilde{P}_2 + \sigma^2 I)^{-1}$. Observe that the ZF-based method and the MMSA-based method are only example methods, any other possible method may be used.

Thereafter, the first part of BFW $\tilde{P}_1$ and non-zero values of $\tilde{P}_2$ together with a bitmask indicating the selected entries in $\tilde{P}_2$ are sent to the first RU 520. The bitmask size for all RUs is $(\Sigma_{l=1}^L N_l) \times K$ bits, which can be shared between multiple resource blocks (RBs) and thereby the overhead can be small. Here, without considering the overhead of bitmask, the number of bits needed for transporting the BFWs are $(M+K)KQ$. To guarantee a well-conditioned matrix inversion for the $P\tilde{P}_1$ calculation, it is suggested that $\overline{M} \geq K$. To get a good performance, the selected entries should capture most of the channel energy of the DL channel estimate H.

As one example, if each of the L RUs has N antennas and each selects K out of the N beams, the number of BFWs transported are $(L+1)K^2$. For the uncompressed case, the number of BFWs are LNK. Therefore, the compression ratio equals to $$\frac{(L+1)K}{LN}.$$

When L is large, it will approach to K/N. For L=4, N=32 and K=16, the compression reduces BFWs to 62.5% of the uncompressed case. If K=8, it is further reduced to 31.25%. Therefore, it can significantly reduce the required link capacity for transporting BFWs. Performance-wise, our studies have shown that selecting K beams for a K-layer system performs quite close to the full system without beam selection.

A second embodiment for compressing the second part of BFWs $P_2$ at the BBU is a compression of $P_2$ using fewer bits. Originally, when BFWs of P is transported, the BFWs needs to be quantized with high precision since large quantization errors would degrade interference-cancellation performance between layers. In this invention, for the same reason, the BFWs of $P_1$ should be also quantized to the same level of precision as BFWs of P. However, $P_2$ can afford some accuracy loss with fewer bits in quantization. Therefore, to transport $P_2$ over the FH link with fewer bits can also reduce the required FH capacity. Note that this embodiment does not require that the BFW is calculated based on beam/direction-domain channels.

The second part of the BFW may be determined as $$P_2 = [P_{2,RU\ 1}^T \ldots P_{2,RU\ l}^T \ldots P_{2,RU\ L}^T]^T \text{ where } P_{2,RU\ l} = H^*_l,$$

i.e. the same way as in the first embodiment. Thereafter, the second part of the BFWs $P_2$ are compressed with fewer bits per BFW, the result of which is denoted as $\tilde{P}_2$. This embodiment can be implemented on top of the first Embodiment, i.e. to represent the non-zero weights with fewer bits. The compressed $\tilde{P}_2$ can be expressed as $$\tilde{P}_2 = [\tilde{P}_{2,RU\ 1}^T \ldots \tilde{P}_{2,RU\ l}^T \ldots \tilde{P}_{2,RU\ L}^T]^T.$$

The common first part of the BFW $P_1$ is then calculated according to $\tilde{P}_2$ based on Eqs. (1) or (2), depending on whether the ZF-method or the MMSE-method is used. For the ZF-based method, $\tilde{P}_1 = (H\tilde{P}_2)^{-1}$. For the MMSE-based method, $\tilde{P}_1 = (H\tilde{P}_2 + \sigma^2)^{-1}$. Observe that the ZF-based method and the MMSA-based method are only example methods, any other possible method may be used. Thereafter, the first part of BFW $\tilde{P}_1$ and the compressed second part of BFW $\tilde{P}_2$ are sent to the first RU 520.

Going back to FIG. 7, we will now take a look at what happens at each of the RUs 520, 560 and 570 when receiving the FEC coded user layer signals and the calculated first and second part of BFW from the BBU 510. The first RU 520 comprises a modulation unit 522 that modulates the FEC coded user layer signals received over the FH link 540. The first RU 520 further comprises an extraction unit 524 that extracts the portion of the second part of the BFWs received over the FH link 540 that is specific for the first RU, this portion being called the first portion of the BFWs and being denoted as $\tilde{P}_{2,RU\ 1}$ in FIG. 7. The extraction unit 524 further sends the remaining second part of the BFW $\tilde{P}_2$ i.e. without the first portion, to the second RU 560. The first RU also sends the first part of BFWs further to the second RU, after copying it. The first RU also sends the FEC coded user layer signals received from the BBU further to the second RU 560.

The first RU 520 then calculates the BFWs for itself as $P_{RU\ 1} = \tilde{P}_{2,RU\ 1} \tilde{P}_1$, i.e. based on the first part of the BFW and the compressed first portion of the BFWs. Further, the first RU 520 comprises a beamforming unit 526 that beamforms the modulated user layer signals x with the BFWs of the first RU $P_{RU\ 1}$ so as to create antenna signals $y_1 = P_{RU\ 1} x$. The first RU 520 further has Inverse Fast Fourier Transformation (IFFT) and RF-related circuitry 528 that performs IFFT on the beamformed user layer signal in frequency domain so that the signal is transformed into time domain. Thereafter, the time-domain signal is converted from a digital to an analog signal by a digital-to-analog converter and then frequency upconverted to an RF signal, before being transmitted wirelessly from the N1 antennas of the first RU towards UEs 531, 532.

Further, for the first embodiment of compression of the second part of BFWs $P_2$ performed at the BBU, the first RU 520 receives the first part of the BFW $\tilde{P}_1$ and non-zero weights of the second part $\tilde{P}_2$ together with the bitmask of $\tilde{P}_2$ from the BBU. In this embodiment, the extraction unit 524 not only extracts the first portion of the of the second part of the BFW but also extracts the bitmask for the first portion of the BFW. In a similar way, the extraction unit 524 not only sends the remaining portions of the second part of the BFWs to the second RU 560 but also sends the remaining bitmask for the remaining portions of the second part of the BFWs. Further, the first portion of the BFWs is reconstructed be filling zeroes in the matrix using the extracted bitmask for the first portion of the BFW.

For the second embodiment, the first portion of the BFWs is reconstructed by dequantization.

Please note that in 3GPP option 7-3, the coded bits are received by the first RU 520 from the BBU 510 over the fronthaul interface together with BFWs. The modulated symbols x is modulated on the received coded bits. In O-RAN, the modulated symbols x may be compressed. In this case, the first RU decompress the compressed symbols to obtain the modulated symbols x.

The second RU 560 has similar units as the first RU, i.e. a modulation unit 562, an extraction unit 564, a beamforming unit 566, IFFT and RF-related circuitry 568, and N2 antennas. The modulation unit 562 modulates the FEC coded user layer signals received from the first RU. The second RU 560 receives the remaining portions of the second part of BFW from the first RU 520, i.e. the second part of BFW without the first portion. The extraction unit 564 of the second RU extracts the portion of the second part of the BFWs that is specific for the first RU, this portion being called the second portion of the BFWs and being denoted as $\tilde{P}_{2,Ru\_2}$ in FIG. 7. The extraction unit 564 further sends the remaining second part of the BFW $\tilde{P}_2$ i.e. without the first portion and the second portion, to the remaining RUs, here RU L 570. The second RU 560 also sends the first part of the BFWs further to the RU L, after copying it. The second RU 560 also sends the FEC coded user layer signals received from the first RU 510 further to the RU L 570.

The second RU 560 then calculates the BFWs for itself as $P_{RU\_2}=\tilde{P}_{2,RU\_2}\tilde{P}_1$, i.e. based on the first part of the BFW and the compressed second portion of the BFWs. Further, the beamforming unit 566 beamforms the modulated user layer signals x with the BFWs of the second RU $P_{RU\_2}$ so as to create antenna signals $y_2=P_{RU\_2}x$. The IFFT and RF-related circuitry 568 performs IFFT on the antenna signals in frequency domain so that the signal is transformed into time domain, and then being transmitted wirelessly from the N2 antennas of the second RU towards UEs 531, 532.

Further, for the first embodiment of compression of the second part of BFWs $P_2$ performed at the BBU, the second RU 560 receives the first part of the BFW $\tilde{P}_1$ and non-zero weights of the remaining portions of the second part $\tilde{P}_2$ together with the remaining bitmask of $\tilde{P}_2$ from the first RU. In this embodiment, the extraction unit 564 not only extracts the second portion of the of the second part of the BFW but also extracts the bitmask for the second portion of the BFW. In a similar way, the extraction unit 564 not only sends the remaining portions of the second part of the BFWs to the RU L 570 but also sends the remaining bitmask for the remaining portions of the second part of the BFWs. Further, the second portion of the BFWs is reconstructed be filling zeroes in the matrix using the extracted bitmask for the second portion of the BFW.

For the second embodiment, the second portion of the BFWs is reconstructed by dequantization.

The RU L 570 has similar units as the first and second RU, i.e. a modulation unit 572, a beamforming unit 576, IFFT and RF-related circuitry 578, and NL antennas, which have a similar role as for the first and second RU. However, as the RU L is last in the cascade, it does not need to have an extraction unit. Similarly, there is no need to extract any data and send other data further as the received data will be used in the last RU of the cascade.

According to another embodiment, here may be a scaling factor between MIMO user layers. Once the BFWs have been calculated, the DL implementation may require adjusting the power over the number of co-scheduled UEs or MIMO layers in order to allocate power to every UE or MIMO layers. Let D denote a K×K diagonal matrix where each diagonal element represents a power-allocation factor with respect to the corresponding column of P. The power-allocation factor does not only control the power allocation among MIMO layers but also normalizes the BFWs, which reduces the dynamic range of BFWs facilitating efficient quantization. Including the scaling matrix D, the transmit signal can be expressed as $$y=PDx$$

According to earlier embodiments, the BFWs are made up from a first and a second part $P=\tilde{P}_2\tilde{P}_1$. The two parts of BFWs in $\tilde{P}_1$ and $\tilde{P}_2$ sent respectively from the BBU 510 to the first RU 520 need to be normalized as well so that the dynamic range of the BFWs is reduced when transporting over the fronthaul link 540. To achieve the same transmit signal y as expressed above, the normalized first part and second part of BFWs can be composed as $$\overline{P}_1 = D_2^{-1}\tilde{P}_1 D_1$$

$$\overline{P}_2 = \tilde{P}_2 D_2$$

where $D_1$ is a K×K diagonal matrix where each diagonal element represents a scaling factor with respect to each column of $D_1^{-1}\tilde{P}_1$, and $D_2$ is a K×K diagonal matrix where each diagonal element represents a scaling factor with respect to each column of $\tilde{P}_2$. In order to reconstruct y, the BBU 510 needs to additionally send to the first RU 520, the scaling factors in $$\overline{D}=D_1^{-1}D$$

where $\overline{D}$ is a diagonal matrix containing K real values. The first RU 520 constructs $\overline{P}'_1=\overline{P}_1\overline{D}$ and forwards it to the second RU 560 together with the remaining part of $\overline{P}_2$, and so forth to the remaining RU, i.e. RU L, as described above. Upon receiving $\overline{P}_1$, $\overline{P}_2$, and $\overline{D}$, the transmit signal from the effective antenna array can be obtained by the first RU as $$\overline{P}_2\overline{P}'_1 x = \overline{P}_2 D_2 D_2^{-1}\tilde{P}_1 D_1 D_1^{-1} Dx = \overline{P}_2\tilde{P}_1 Dx = PDx = y$$

resulting in the transmit signal y originally intended.

A similar method as described above for DL transmission of user layer signals can also be used for UL transmission of user layer signals, given an architecture that the channel estimation and BFW calculation are conducted in the BBU while the beamforming is performed in the each of the cascaded RUs. In a similar way as in DL, the BBU sends the BFWs to the cascaded RUs, via the first RU, and then the second RU etc. Each RU receives the BFWs, extract its own BFWs and forwards the rest of the BFWs to the next RU. Let $$H_{UL} \in \mathbb{C}^{(\Sigma_{l=1}^L N_l) \times K}$$

denote the effective UL channel comprising the L RUs. If ZF-based beamforming is used, the BFWs can be expressed as $$W_{ZF} = \underbrace{(H_{UL}^* H_{UL})^{-1}}_{W_1} \underbrace{H_{UL}^*}_{W_2}$$

If MMSE-based beamforming is used, the BFWs can be expressed as $$W_{MMSE} = \underbrace{(H_{UL}^* H_{UL} + \sigma^2 I)^{-1}}_{W_1} \underbrace{H_{UL}^*}_{W_2}$$

where $\sigma_2$ is a measure of interference and noise (or error terms) and I is a K×K identity matrix. $W_1$ denotes the first part of the BFWs for UL and $W_2$ denotes the second part of the BFWs for UL, in a similar way as for the BFWs for DL. Both $W_1$ and $W_2$ are calculated in the BBU. According to the invention, the second part of the BFWs $W_2$ can be compressed as $\tilde{W}_2$ using one of the earlier described embodiments for DL. Note that $$P_2 \in \mathbb{C}^{(\Sigma_{l=1}^L N_l) \times K}$$

while $$W_2 \in \mathbb{C}^{K \times \Sigma_{l=1}^L N_l},$$

therefore the selection of $\overline{M}$ entries from each column of $P_2$ in the DL should be done as selection of $\overline{M}$ columns from each row of $W_2$ in the UL. Then $\tilde{W}_1$ is calculated based on $\tilde{W}_2$. The BBU sends the compressed $\tilde{W}_2$ in terms of the non-zero part of $\tilde{W}_2$ plus bitmask, for the first compression embodiment, or the complete $\tilde{W}_2$ for the second compression embodiment, together with $\tilde{W}_1$ over the fronthaul link to the first RU.

At the first RU, the first portion of the second part of the BFW, $\tilde{W}_{2,RU\;1}$ is reconstructed based on the first portion extracted from the received BFWs, and on a bitmask when the first compression embodiment is used. The first RU forwards the remaining part of the second part of the BFW $\tilde{W}_2$ and the remaining part of the bitmask (for the first compression embodiment) together with the first part of the BFWs $\tilde{W}_1$ to the second RU. The first RU calculates the BFWs for the first RU as $W_{RU\;1} = \tilde{W}_1 \tilde{W}_{2,RU\;1}$ and conducts beamforming accordingly. The procedure repeats at each of the cascaded RUs until the BFWs arrives at RU L. In order to perform beamforming on the UL signals received at its antennas from the UEs, the first RU combines the received UL antenna signals at the N1 antennas into first K user-layer signals, using the calculated BFW for the first RU. Then the first RU receives, from the second RU, second K user layer signals that the second RU has beamformed, i.e. combined in a similar way, that is combined by the second RU from antenna signals received at the N2 antennas of the second RU from the UEs, the combining by the second RU being based on BFWs calculated by the second RU from the first part and a second portion of the second part of the BFW, which the first RU forwarded when receiving the BFWs from the BBU. The first RU then combines the first and second K user-layer signals into combined K user layer signals and sends the combined K user layer signals to the BBU. In case there are more than two cascade coupled RUs, the following RUs in the chain beamform antenna signals received at their antennas in a similar way, i.e. combining into user layer signals using the first part of the BFWs and a certain portion of the second part of the BFWs and send the combined user layer signals upwards in the cascade towards the BBU, for combining with user layer signals of RUs situated closer to the BBU, on their way towards the BBU.

Except for being used for a distributed base station with separately located RUs, where each RU is arranged on a separate Printed Circuit Boards (PCBs), the above-described embodiments may also be used in a single large RU design with multiple radio processors, where each radio processor would take the role of an RU in the embodiments above. In this case, the radio processors/RUs may be arranged on one and the same PCB. The radio processors are then implemented in a cascaded topology, i.e. as in the described FIG. 2. This can significantly reduce the number of SerDes lanes on the PCB between the radio processors and a fronthaul interface that is to be connected to the BBU, comparing to a star-topology design. The overall required fronthaul link capacity is also significantly reduced.

Figure 8:
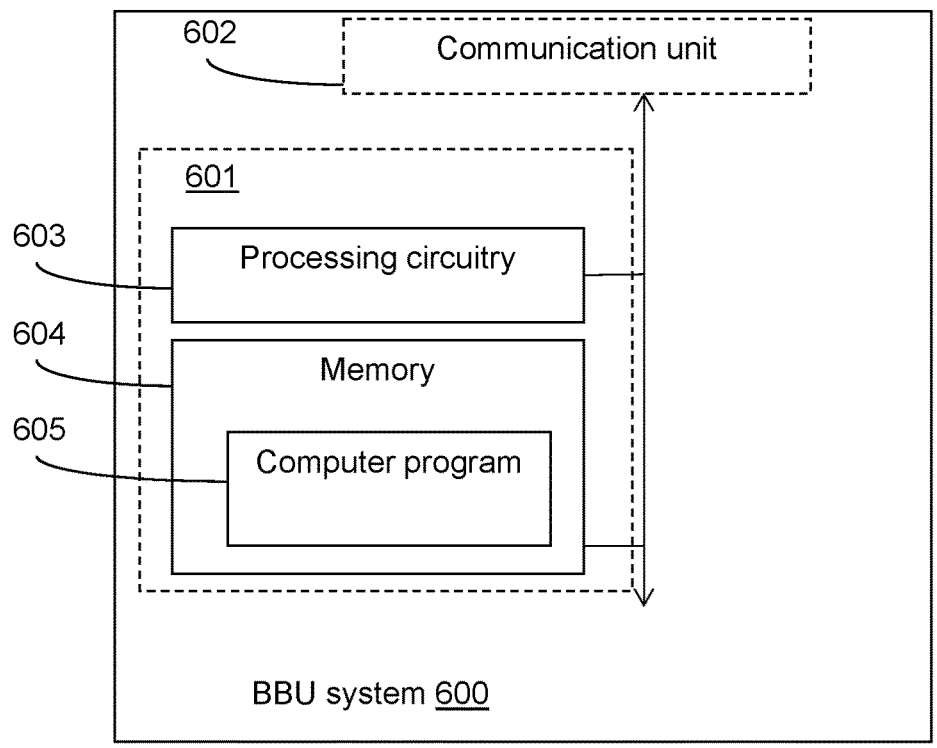
FIG. 8 is a schematic block diagram illustrating a BBU system in more detail, according to further possible embodiments.

FIG. 8, in conjunction with FIG. 2, describes a BBU system 600 configured to operate in a wireless communication network. The wireless communication network comprises a distributed base station system 100 comprising a BBU 110, a first RU 120 connected to the BBU 110 over a fronthaul link 140, the first RU comprising N1 antennas 121, 122, 123. The distributed base station system further comprises a second RU 160 connected to the first RU 120 over an RU link 165, the second RU 160 comprising N2 antennas 161, 162, 163. The BBU system 600 also comprises a processing circuitry 603 and a memory 604. Said memory contains instructions executable by said processing circuitry, whereby the BBU system 600 is operative for determining a first portion of BFW in frequency domain, based on a DL channel estimate of the first RU 120, wherein the BFW are to be used for beamforming K user-layer DL signals to be sent to a number of UEs 131, 132, 133, the first portion of the BFW being determined for expanding, in frequency domain, the K user-layer signals to antenna signals of the N1 antennas 121, 122, 123 of the first RU 120. The BBU system 600 is further operative for determining a second portion of the BFW in frequency domain, based on a DL channel estimate of the second RU 160, the second portion of the BFW being determined for expanding, in frequency domain, the K user-layer signals to antenna signals of the N2 antennas 161, 162, 163 of the second RU 160, and for determining a first part of the BFW in frequency domain, based on the DL channel estimates of the first RU 120 and the second RU 160, wherein the first part of the BFW is determined for performing interference cancellation between the user-layer signals. The BBU system 600 is further operative for triggering sending of the first part of the BFW and the first and second portion of the BFW to the first RU 120, and triggering sending of the K user-layer signals in frequency domain to the first RU 120.

The BBU system 600 may be the actual BBU 110, a unit in the BBU 110 or in the distributed base station system 100. Alternatively, the BBU system 600 may be arranged in or at any other network node of the communication network, such as a node further away from the UEs, e.g. another network element in the RAN or close to the RAN or another RAN node. In this alternative, and in the cloud-solution embodiment discussed below, the BBU 110 is arranged to receive, from the first and the second RU 120, 160, respectively, uplink signals, e.g. reference signals such as SRS or DMRS, which the RUs have received from the UEs, or information related to those uplink signals, and to communicate the uplink signals/information to the other network node that is arranged to determine the DL channel estimate of each RU, and from the respective DL channel estimate determine the first and second part of the BFW as shown above. The other network node is then arranged to send the determined first and second part of the BFW back to the BBU 110 for further distribution to the first RU 120. Alternatively, the BBU system 600 may be realized as a group of network nodes, wherein functionality of the BBU system is spread out over different physical, or virtual, nodes of the network. The latter may be called a "cloud-solution.

According to an embodiment, the BBU system 600 is further operative for compressing the first portion and the second portion of the BFW to a higher degree than any compression of the first part of the BFW.

According to another embodiment, the BBU system 600 is operative for the determining of the first part of the BFW based on the DL channel estimate of the first RU 120, the DL channel estimate of the second RU 160, and on the compressed first and second portion of the BFW.

According to another embodiment, the BBU system 600 is operative for the compression of the first and second portion of the BFW by selecting only a subset of the determined first and second portion of the BFW, the subset being a number of BFW with largest magnitude for each user-layer signal, and operative for the triggering sending of the compressed first and second portion of the BFW to the first RU 120 by sending the selected subset of the first and second portion of the BFW to the first RU.

According to another embodiment, the BBU system 600 is operative for the compression of the first and second portion of the BFW by using fewer bits for representing individual BFW than a number of bits used for the first and second portion before the compression.

According to yet another embodiment, the BBU system 600 is further operative for sending, to the first RU 120, first compression information on the compression of the first portion of the BFW and second compression information on the compression of the second portion of the BFW, the first and second compression information being for decompression at the first and second RU, respectively.

According to yet another embodiment, the BBU system 600 is further operative for combining the first portion and the second portion of the BFW into a second part of the BFW.

According to still another embodiment, the BBU system 600 is further operative for determining the DL channel estimate of the first RU 120 based on UL signals originating from the number of UEs 131, 132, 133 and received at the antennas 121, 122, 123 of the first RU 120, and determining the DL channel estimate of the second RU 160 based on UL signals originating from the number of UEs 131, 132, 133 and received at the antennas 161, 162, 163 of the second RU 160.

According to still another embodiment, the BBU system 600 is further operative for normalizing the first part and the first and second portion of the BFW, and sending, to the first RU 120, information on a scaling factor per user layer relating to the normalization.

According to another embodiment, the distributed base station system 100 further comprises a third RU 170 connected to the second RU 160 over a second RU link 175, the third RU 170 comprising N3 antennas 171, 172, 173. The BBU system 600 is further operative for determining a third portion of the BFW in frequency domain based on a determined DL channel estimate of the third RU 170, the third portion of the BFW being determined for expanding, in frequency domain, the K user-layer signals to antenna signals of the N3 antennas 171, 172, 173 of the third RU 170. Also, the BBU system 600 is operative for the triggering sending of the first part of the BFW and the first and second portion of the BFW to the first RU 120 by also triggering sending the third portion of the BFW to the first RU 120.

According to an alternative aspect, the memory 604 of the BBU system of FIG. 8 contains instructions executable by the processing circuitry 603, whereby the BBU system 600 is operative for determining a first portion of BFW in frequency domain, based on an UL channel estimate of the first RU 120, wherein the first portion of BFW is to be used for combining, in frequency-domain, antenna signals received at the N1 antennas of the first RU 120 from a number of UEs 131, 132, 133 to K user-layer signals of the first RU, and for determining a second portion of the BFW in frequency domain, based on an UL channel estimate of the second RU 160, wherein the second portion of BFW are to be used for combining frequency-domain signals received at the N2 antennas of the second RU 160 from the number of UEs 131, 132, 133 to K user-layer signals of the second RU. The BBU system 600 is further operative for determining a first part of the BFW in frequency domain based on the UL channel estimates of the first RU 120 and the second RU 160, wherein the first part of the BFW is determined for performing interference cancellation between the user-layer signals in the first and the second RU, and triggering sending the first part of the BFW and the first and second portion of the BFW to the first RU 120. This alternative aspect handles UL transmission of user layer signals. The embodiments mentioned above in connection with FIG. 8 are also applicable to this aspect.

According to other embodiments, the BBU system 600 may further comprise a communication unit 602, which may be considered to comprise conventional means for communication with other network nodes of the wireless communication network 100, such as the BBU, in case the BBU system is not the actual BBU, and with the first RU 120. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the BBU system 600 to perform the steps described in any of the described embodiments of the BBU system 600 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the BBU system 600 has access via the communication unit 602. The computer program 605 may then be downloaded from the server into the memory 604.

Figure 9:
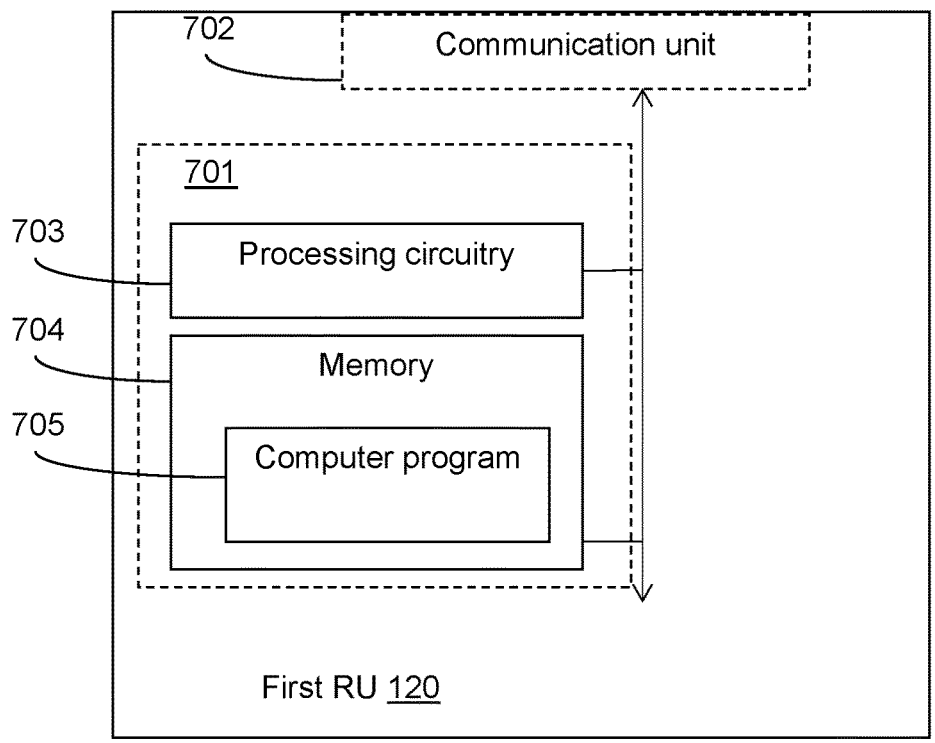
FIG. 9 is a schematic block diagram illustrating a first RU in more detail, according to further possible embodiments.

FIG. 9, in conjunction with FIG. 2, describes a first RU 120 configured to operate in a distributed base station system 100, the first RU 120 comprising N1 antennas 121, 122, 123. The distributed base station system 100 further comprises a BBU 110 connected to the first RU 120 over a fronthaul link 140 and a second RU 160 connected to the first RU 120 over an RU link 165, the second RU comprising N2 antennas. The first RU 120 comprises a processing circuitry 703 and a memory 704. Said memory contains instructions executable by said processing circuitry, whereby the first RU 120 is operative for receiving, from the BBU 110, K user-layer DL signals in frequency domain, to be sent to a number of UEs 131, 132, 133, and for receiving, from the BBU 110, a first part of BFW and a first and second portion of BFW for beamforming the K user-layer signals in frequency domain, the first portion being based on a determined DL channel estimate of the first RU 120, the first portion being determined for expanding, in frequency domain, the user-layer signals to antenna signals of the N1 antennas 121, 122, 123 of the first RU 120, the second portion being based on a determined DL channel estimate of the second RU 160, the second portion being determined for expanding, in frequency domain, the user-layer signals to antenna signals of the N2 antennas 161, 162, 163 of the second RU 160, the first part of the BFW being based on the determined DL channel estimates of the first RU 120 and the second RU 160, and the first part of the BFW being determined for performing interference cancellation between the user-layer signals. The first RU 120 is further operative for determining BFW for the first RU 120 based on the received first part and first portion of the BFW, sending, to the second RU 160 over the RU link 165, the received first part and second portion of the BFW, sending, to the second RU 160 over the RU link 165, the received K user-layer DL signals in frequency domain, beamforming the received K user-layer signals into antenna signals, using the determined BFW for the first RU 160, and sending the antenna signals to the number of UEs 131, 132, 133 via the N1 antennas 121, 122, 123.

According to an embodiment, the first RU 120 is further operative for extracting the first portion and the first part of the BFW from the received first part and the first and second portion of BFW.

According to another embodiment, the first RU 120 is further operative for decompressing the first portion of the BFW when the first portion of the BFW was compressed at the BBU.

According to another embodiment, the first RU 120 is further operative for receiving, from the BBU 110, first compression information on compression of the first portion of the BFW and second compression information on compression of the second portion of the BFW, the first and second portion of the BFW being compressed by the BBU to a higher degree than any compression of the first part of the BFW, wherein the first RU is operative for performing the decompressing of the first portion of the BFW according to the first compression information, and sending the second compression information to the second RU 160 over the RU link 165.

According to yet another embodiment, the received first part and the first and second portion of the BFW are normalized. The first RU is also operative for receiving, from the BBU 110, information on a scaling factor per user-layer relating to the normalization, and scaling the received normalized first part and first portion of the BFW according to the information on the scaling factors before the beamforming.

According to yet another embodiment, the first RU 120 is further operative for sending the information on the scaling factor per user-layer to the second RU 160.

According to still another embodiment, the distributed base station system 100 further comprises a third RU 170 connected to the second RU 160 over a second RU link 175, the third RU 170 comprising N3 antennas 171, 172, 173. The first RU 120 is operative for the receiving of BFW by also receiving a third portion of the BFW, determined based on a DL channel estimate for the third RU 170 for expanding, in frequency domain, the user-layer signals to antenna signals of the N3 antennas 171, 172, 173 of the third RU 170, and the first part of the BFW being based on DL channel estimates for the first RU 120, the second RU 160 and the third RU 170. The first RU 120 is also operative for sending, to the second RU 160 over the RU link 165, the third portion of the BFW for further transmission to the third RU 170 over the second RU link 175.

According to an alternative aspect, the memory 704 of the first RU 120 of FIG. 9 contains instructions executable by the processing circuitry 703, whereby the first RU is operative for receiving, from a number of UEs 131, 132, 133, UL antenna signals at the N1 antennas, and receiving, from the BBU 110, a first part of BFW, and a first and second portion of the BFW, the first portion being based on a determined UL channel estimate of the first RU 120, the first portion being determined for combining, in frequency-domain, the UL antenna signals received at the N1 antennas to user-layer signals, the second portion being based on a determined UL channel estimate of the second RU 160, the second portion being determined for combining, in frequency-domain, antenna signals received at the N2 antennas of the second RU 160 to user-layer signals, the first part of the BFW being based on the determined UL channel estimates of the first RU 120 and the second RU 160, and the first part of the BFW being determined for performing interference cancellation between the user-layer signals. The first RU 120 is also operative for determining BFW for the first RU based on the received first part and first portion of the BFW, sending, to the second RU 160 over the RU link 165, the received first part and second portion of the BFW, and combining, in frequency-domain, the received UL antenna signals at the N1 antennas into first K user layer signals, using the determined BFW for the first RU 120. The first RU 120 is also operative for receiving, from the second RU 160, second K user layer signals combined by the second RU from antenna signals received at the N2 antennas of the second RU 160 from the number of UEs 131, 132, 133, the combining by the second RU being based on the first part and second portion of the BFW sent to the second RU by the first RU, combining the first and second K user layer signals into combined K user layer signals, and sending the combined K user layer signals to the BBU 110. The embodiments mentioned above in connection with FIG. 9 are also applicable to this aspect.

According to other embodiments, the first RU 120 may further comprise a communication unit 702, which may be considered to comprise conventional means for wireless communication with the UEs 131, 132, 133, such as a transceiver for wireless transmission and reception of signals. The communication unit 702 may also comprise conventional means for communication with the BBU 110, and with the second RU 160. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the first RU 120 to perform the steps described in any of the described embodiments of the first RU 120 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 704. Alternatively, the computer program may be stored on a server or any other entity to which the first RU 120 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a Baseband unit (BBU) system of a wireless communication network, the wireless communication network comprising a distributed base station system comprising the BBU, a first radio unit (RU) and a second RU, the first RU being connected to the BBU over a fronthaul link and comprising N1 antennas, the second RU being connected to the first RU over a RU link and comprising N2 antennas, the method comprising:

determining a first portion of beamforming weights (BFW), in a frequency domain, based on a downlink (DL) channel estimate of the first RU, wherein the BFW are to be used for beamforming K user-layer DL signals to be sent to a number of user equipment (UE), the first portion of the BFW being determined for expanding, in the frequency domain, the K user-layer signals to antenna signals of the N1 antennas of the first RU;

determining a second portion of the BFW, in the frequency domain, based on a DL channel estimate of the second RU, the second portion of the BFW being determined for expanding, in the frequency domain, the K user-layer signals to antenna signals of the N2 antennas of the second RU;

determining a first part of the BFW, in the frequency domain, based on the DL channel estimates of the first RU and the second RU, wherein the first part of the BFW is determined for performing interference cancellation between the K user-layer signals;

triggering sending the first part of the BFW and the first and second portion of the BFW to the first RU; and triggering sending the K user-layer signals in the frequency domain to the first RU.

2. The method of claim 1, further comprising compressing the first portion and the second portion of the BFW to a higher degree than any compression of the first part of the BFW.

3. The method of claim 2, wherein the first part of the BFW is determined based on the DL channel estimate of the first RU, the DL channel estimate of the second RU, and on the compressed first and second portion of the BFW.

4. The method of claim 2, wherein the first and second portion of the BFW are compressed by selecting only a subset of the determined first and second portion of the BFW, the subset being a number of BFW with largest magnitude for each user-layer signal, and wherein the triggering sending of the compressed first and second portion of the BFW to the first RU implies sending the selected subset of the first and second portion of the BFW to the first RU.

5. The method of claim 1, wherein the distributed base station system further comprises a third RU connected to the second RU over a second RU link, the third RU comprising N3 antennas, the method further comprising:

determining a third portion of the BFW in the frequency domain based on a determined DL channel estimate of the third RU, the third portion of the BFW being determined for expanding, in the frequency domain, the K user-layer signals to antenna signals of the N3 antennas of the third RU; and wherein the triggering sending of the first part of the BFW and the first and second portion of the BFW to the first RU further comprises triggering sending the third portion of the BFW to the first RU.

6. A method performed by a first radio unit (RU) of a distributed base station system, the first RU comprising N1 antennas, the distributed base station system further comprising a Baseband unit (BBU) connected to the first RU over a fronthaul link and a second RU connected to the first RU over an RU link, the second RU comprising N2 antennas, the method comprising:

receiving, from the BBU, K user-layer downlink (DL) signals, in a frequency domain, to be sent to a number of user equipment (UEs);

receiving, from the BBU, a first part of beamforming weights (BFW), and a first and second portion of BFW for beamforming the K user-layer signals in the frequency domain, the first portion being based on a determined DL channel estimate of the first RU, the first portion being determined for expanding, in the frequency domain, the user-layer signals to antenna signals of the N1 antennas of the first RU, the second portion being based on a determined DL channel estimate of the second RU, the second portion being determined for expanding, in the frequency domain, the user-layer signals to antenna signals of the N2 antennas of the second RU, the first part of the BFW being based on the determined DL channel estimates of the first RU and the second RU, and the first part of the BFW being determined for performing interference cancellation between the user-layer signals;

determining BFW for the first RU based on the received first part and first portion of the BFW;

sending, to the second RU over the RU link, the received first part and second portion of the BFW;

sending, to the second RU over the RU link, the received K user-layer DL signals in the frequency domain;

beamforming the received K user-layer signals into antenna signals, using the determined BFW for the first RU, and sending the antenna signals to the number of UEs via the N1 antennas.

7. The method of claim 6, further comprising:

receiving, from the BBU, first compression information on compression of the first portion of the BFW and second compression information on compression of the second portion of the BFW, the first and second portion of the BFW being compressed by the BBU to a higher degree than any compression of the first part of the BFW, wherein a decompressing of the first portion of the BFW is performed according to the first compression information; and sending the second compression information to the second RU over the RU link.

8. The method of claim 6, wherein the distributed base station system further comprises a third RU connected to the second RU over a second RU link, the third RU comprising N3 antennas, wherein the receiving of BFW further comprises receiving a third portion of the BFW, determined based on a DL channel estimate for the third RU for expanding, in the frequency domain, the user-layer signals to antenna signals of the N3 antennas of the third RU, and the first part of the BFW being based on DL channel estimates for the first RU, the second RU and the third RU, the method further comprising sending, to the second RU over the RU link, the third portion of the BFW for further transmission to the third RU over the second RU link.

9. A method performed by a Baseband unit (BBU) system of a wireless communication network, the wireless communication network comprising a distributed base station system comprising a BBU, a first radio unit (RU), and a second RU, the first RU connected to the BBU over a fronthaul link and comprising N1 antennas, the second RU connected to the first RU over an RU link and comprising N2 antennas, the method comprising:

determining a first portion of beamforming weights (BFW), in a frequency domain, based on an uplink (UL) channel estimate of the first RU, wherein the first portion of BFW is to be used for combining, in frequency-domain, antenna signals received at the N1 antennas of the first RU from a number of User Equipment (UEs) to K user-layer signals of the first RU;

determining a second portion of the BFW, in the frequency domain, based on an UL channel estimate of the second RU, wherein the second portion of BFW are to be used for combining frequency-domain signals received at the N2 antennas of the second RU from the number of UEs to K user-layer signals of the second RU;

determining a first part of the BFW in the frequency domain based on the UL channel estimates of the first RU and the second RU, wherein the first part of the BFW is determined for performing interference cancellation between the user-layer signals in the first and the second RU; and triggering sending the first part of the BFW and the first and second portion of the BFW to the first RU.

10. A method performed by a first radio unit (RU) of a distributed base station system, the first RU comprising N1 antennas, the distributed base station system further comprising a Baseband unit (BBU) connected to the first RU over a fronthaul link and a second RU connected to the first RU over an RU link, the second RU comprising N2 antennas, the method comprising:

receiving, from a number of user equipment (UEs), uplink (UL) antenna signals at the N1 antennas;

receiving, from the BBU, a first part of beamforming weights (BFW), and a first and second portion of the BFW, the first portion being based on a determined UL channel estimate of the first RU, the first portion being determined for combining, in frequency-domain, the UL antenna signals received at the N1 antennas to user-layer signals, the second portion being based on a determined UL channel estimate of the second RU, the second portion being determined for combining, in frequency-domain, antenna signals received at the N2 antennas of the second RU to user-layer signals, the first part of the BFW being based on the determined UL channel estimates of the first RU and the second RU, and the first part of the BFW being determined for performing interference cancellation between the user-layer signals;

determining BFW for the first RU based on the received first part and first portion of the BFW;

sending, to the second RU over the RU link, the received first part and second portion of the BFW;

combining, in frequency-domain, the received UL antenna signals at the N1 antennas into first K user layer signals, using the determined BFW for the first RU;

receiving, from the second RU, second K user layer signals combined by the second RU from antenna signals received at the N2 antennas of the second RU from the number of Ues, the combining by the second RU being based on the first part and second portion of the BFW sent to the second RU by the first RU;

combining the first and second K user layer signals into combined K user layer signals; and sending the combined K user layer signals to the BBU.

11. A baseband unit (BBU) system operable in a wireless communication network comprising a distributed base station system, the distributed base station system comprising a BBU, a first radio unit (RU) and a second RU, the first RU connected to the BBU over a fronthaul link, the first RU comprising N1 antennas, the second RU connected to the first RU over a RU link, and the second RU comprising N2 antennas, the BBU system comprising:
  processing circuitry and memory, the memory containing instructions executable by the processing circuitry, whereby the processing circuitry is configured to:
    determine a first portion of beamforming weights (BFW), in a frequency domain, based on a downlink (DL) channel estimate of the first RU, wherein the BFW are to be used for beamforming K user-layer DL signals to be sent to a number of user equipment (UEs), the first portion of the BFW being determined for expanding, in the frequency domain, the K user-layer signals to antenna signals of the N1 antennas of the first RU;
    determine a second portion of the BFW, in the frequency domain, based on a DL channel estimate of the second RU, the second portion of the BFW being determined for expanding, in the frequency domain, the K user-layer signals to antenna signals of the N2 antennas of the second RU;
    determine a first part of the BFW in the frequency domain, based on the DL channel estimates of the first RU and the second RU, wherein the first part of the BFW is determined for performing interference cancellation between the user-layer signals;
    trigger sending the first part of the BFW and the first and second portion of the BFW to the first RU; and
    trigger sending the K user-layer signals in the frequency domain to the first RU.

12. The BBU system of claim 11, wherein the processing circuitry is further configured to compress the first portion and the second portion of the BFW to a higher degree than any compression of the first part of the BFW.

13. The BBU system of claim 12, wherein the processing circuitry is further configured to determine the first part of the BFW based on the DL channel estimate of the first RU, the DL channel estimate of the second RU, and on the compressed first and second portion of the BFW.

14. The BBU system of claim 12, wherein the processing circuitry is further configured to:
  compress the first and second portion of the BFW by selecting only a subset of the determined first and second portion of the BFW, the subset being a number of BFW with largest magnitude for each user-layer signal; and
  trigger sending of the compressed first and second portion of the BFW to the first RU by sending the selected subset of the first and second portion of the BFW to the first RU.

15. The BBU system of claim 12, wherein the processing circuitry is further configured to compress the first and second portion of the BFW by using fewer bits for representing individual BFW than a number of bits used for the first portion and second portion before the compression.

16. The BBU system of claim 11, wherein the processing circuitry is further configured to:
  normalize the first part and the first and second portion of the BFW; and
  send, to the first RU, information on a scaling factor per user layer relating to the normalization.

17. The BBU system of claim 11, wherein the distributed base station system further comprises a third RU connected to the second RU over a second RU link, the third RU comprising N3 antennas, the processing circuitry being further configured to:
  determine a third portion of the BFW in frequency domain based on a determined DL channel estimate of the third RU, the third portion of the BFW being determined for expanding, in the frequency domain, the K user-layer signals to antenna signals of the N3 antennas of the third RU; and
  trigger sending of the first part of the BFW and the first and second portion of the BFW to the first RU by also triggering sending the third portion of the BFW to the first RU.

18. A first radio unit (RU) operable in a distributed base station system that further comprises a Baseband unit (BBU) connected to the first RU over a fronthaul link and a second RU connected to the first RU over an RU link, the second RU comprising N2 antennas, the first RU comprising:
  processing circuitry, N1 antennas, and memory, the memory containing instructions executable by the processing circuitry whereby the processing circuitry is configured to:
    receive, from the BBU, K user-layer downlink (DL) signals in frequency domain, to be sent to a number of user equipment (UEs);
    receive, from the BBU, a first part of beamforming weight (BFW) and a first and second portion of BFW for beamforming the K user-layer signals in a frequency domain, the first portion being based on a determined DL channel estimate of the first RU, the first portion being determined for expanding, in the frequency domain, the user-layer signals to antenna signals of the N1 antennas of the first RU, the second portion being based on a determined DL channel estimate of the second RU, the second portion being determined for expanding, in the frequency domain, the user-layer signals to antenna signals of the N2 antennas of the second RU, the first part of the BFW being based on the determined DL channel estimates of the first RU and the second RU, and the first part of the BFW being determined for performing interference cancellation between the user-layer signals;
    determine BFW for the first RU based on the received first part and first portion of the BFW;
    send, to the second RU over the RU link, the received first part and second portion of the BFW;
    send, to the second RU over the RU link, the received K user-layer DL signals in frequency domain;
    beamform the received K user-layer signals into antenna signals, using the determined BFW for the first RU; and
  send the antenna signals to the number of UEs via the N1 antennas.

19. The first RU of claim 18, wherein the processing circuitry is further configured to extract the first portion and the first part of the BFW from the received first part and the first and second portion of BFW.

20. The first RU of claim 18, wherein the processing circuitry is further configured to decompress the first portion of the BFW when the first portion of the BFW was compressed at the BBU.

21. The first RU of claim 20, wherein the processing circuitry is further configured to:
  receive, from the BBU, first compression information on compression of the first portion of the BFW and second compression information on compression of the second portion of the BFW, the first and second portion of the BFW being compressed by the BBU to a higher degree than any compression of the first part of the BFW, wherein the first RU is operative for performing the decompressing of the first portion of the BFW according to the first compression information; and send the second compression information to the second RU over the RU link.

22. The first RU of claim 18, wherein the received first part and the first and second portion of the BFW are normalized, wherein the processing circuitry is configured to:
receive, from the BBU, information on a scaling factor per user-layer relating to the normalization; and
scale the received normalized first part and first portion of the BFW according to the information on the scaling factors before the beamforming.

23. The first RU of claim 22, wherein the processing circuitry is further configured to send the information on the scaling factor per user-layer to the second RU.

24. The first RU of claim 18, wherein:
the distributed base station system further comprises a third RU connected to the second RU over a second RU link;
the third RU comprises N3 antennas;
the processing circuitry is further configured to receive the BFW by also receiving a third portion of the BFW determined based on a DL channel estimate for the third RU for expanding, in frequency domain, the user-layer signals to antenna signals of the N3 antennas of the third RU,
the first part of the BFW is based on DL channel estimates for the first RU, the second RU and the third RU;
the processing circuitry is configured to send, to the second RU over the RU link, the third portion of the BFW for further transmission to the third RU over the second RU link.

25. A Baseband unit (BBU) system operable in a wireless communication network that comprises a distributed base station system, the distributed base station system comprising a BBU, a first radio unit (RU), and a second RU, the first RU connected to the BBU over a fronthaul link and comprising N1 antennas, the second RU connected to the first RU over an RU link (165) and comprising N2 antennas, the BBU system comprising:
processing circuitry and memory, the memory containing instructions executable by the processing circuitry whereby the BBU system is configured to:
determine a first portion of beamforming weights (BFW), in a frequency domain, based on an uplink (UL) channel estimate of the first RU, wherein the first portion of BFW is to be used for combining, in the frequency-domain, antenna signals received at the N1 antennas of the first RU from a number of user equipment (UEs) to K user-layer signals of the first RU;
determine a second portion of the BFW, in the frequency domain, based on an UL channel estimate of the second RU, wherein the second portion of BFW are to be used for combining frequency-domain signals received at the N2 antennas of the second RU from the number of UEs to K user-layer signals of the second RU;
determine a first part of the BFW in the frequency domain based on the UL channel estimates of the first RU and the second RU, wherein the first part of the BFW is determined for performing interference cancellation between the user-layer signals in the first and the second RU, and
trigger sending the first part of the BFW and the first and second portion of the BFW to the first RU (120).

26. A first radio unit (RU) operable in a distributed base station system comprising a Baseband unit (BBU) connected to the first RU over a fronthaul link (140) and a second RU connected to the first RU over an RU link, the second RU comprising N2 antennas, the first RU comprising:
processing circuitry, N1 antennas, and memory, the memory containing instructions executable by the processing circuitry whereby the first RU is configured to:
receive, from a number of UEs, uplink (UL) antenna signals at the N1 antennas;
receive, from the BBU, a first part of beamforming weights (BFW), and a first and second portion of the BFW, the first portion being based on a determined UL channel estimate of the first RU, the first portion being determined for combining, in a frequency-domain, the UL antenna signals received at the N1 antennas to user-layer signals, the second portion being based on a determined UL channel estimate of the second RU, the second portion being determined for combining, in the frequency-domain, antenna signals received at the N2 antennas of the second RU to user-layer signals, the first part of the BFW being based on the determined UL channel estimates of the first RU and the second RU, and the first part of the BFW being determined for performing interference cancellation between the user-layer signals;
determine BFW for the first RU based on the received first part and first portion of the BFW;
send, to the second RU over the RU link, the received first part and second portion of the BFW;
combine, in the frequency-domain, the received UL antenna signals at the N1 antennas into first K user layer signals using the determined BFW for the first RU;
receive, from the second RU, second K user layer signals combined by the second RU from antenna signals received at the N2 antennas of the second RU from the number of UEs, the combining by the second RU being based on the first part and second portion of the BFW sent to the second RU by the first RU;
combine the first and second K user layer signals into combined K user layer signals; and
send the combined K user layer signals to the BBU.

* * * * *